US012537290B2

(12) United States Patent
Kim et al.

(10) Patent No.: US 12,537,290 B2
(45) Date of Patent: Jan. 27, 2026

(54) ANTENNA APPARATUS

(71) Applicant: KMW INC., Hwaseong-si (KR)

(72) Inventors: Duk Yong Kim, Yongin-si (KR); Young Chan Moon, Suwon-si (KR); Joon Hyong Shim, Yongin-si (KR); Sung Hwan So, Hwaseong-si (KR); Bae Mook Jeong, Suwon-si (KR); Min Seon Yun, Anyang-si (KR); Kyo Sung Ji, Hwaseong-si (KR); Chi Back Ryu, Hwaseong-si (KR); Sung Ho Jang, Yongin-si (KR); Jae Hong Kim, Yongin-si (KR); Oh Seog Choi, Hwaseong-si (KR); Yong Won Seo, Daejeon (KR); Won Jun Park, Yongin-si (KR)

(73) Assignee: KMW INC., Hwaseong-si (KR)

( * ) Notice: Subject to any disclaimer, the term of this patent is extended or adjusted under 35 U.S.C. 154(b) by 126 days.

(21) Appl. No.: 18/204,462

(22) Filed: Jun. 1, 2023

(65) Prior Publication Data

US 2023/0327327 A1 Oct. 12, 2023

Related U.S. Application Data

(63) Continuation of application No. PCT/KR2021/017934, filed on Dec. 1, 2021.

(30) Foreign Application Priority Data

Dec. 2, 2020 (KR) ........................ 10-2020-0166910
Nov. 30, 2021 (KR) ........................ 10-2021-0168963

(51) Int. Cl.
*H01Q 1/02* (2006.01)
*H01Q 1/24* (2006.01)
(Continued)

(52) U.S. Cl.
CPC ............... *H01Q 1/246* (2013.01); *H01Q 1/02* (2013.01); *H01Q 1/42* (2013.01); *H01Q 1/50* (2013.01); *H01Q 15/14* (2013.01); *H01Q 21/061* (2013.01)

(58) Field of Classification Search
CPC ............ H01Q 1/02; H01Q 1/246; H01Q 1/42; H01Q 1/50; H01Q 15/14; H01Q 21/061;
(Continued)

(56) References Cited

FOREIGN PATENT DOCUMENTS

| | | |
|---|---|---|
| CN | 110034377 A | 7/2019 |
| JP | H01-143505 A | 6/1989 |

(Continued)

OTHER PUBLICATIONS

International Search Report mailed Feb. 25, 2022 for International Application No. PCT/KR2021/017934 and its English translation.

(Continued)

*Primary Examiner* — Hoang V Nguyen

(57) ABSTRACT

The present disclosure relates to an antenna apparatus, and especially comprises: a main body module in which a main board is mounted; an RF module which is fixed to the front so that an intermediate outside air layer is formed between the RF module and the main body module, and in which an RF filter unit and an antenna element unit are mounted; and an amplification unit module which is disposed so as to be exposed in the intermediate outside air layer between the main body module and the RF module, and comprises an amplification unit substrate having analog amplification elements mounted thereon, wherein heat generated from heating elements mounted on the main board is dissipated through at least any one of the front and back of the main body module, and heat generated from the amplification unit module is directly dissipated through the intermediate out- (Continued)

side air layer, and thus the advantage of enabling maximum heat dissipation performance is provided.

10 Claims, 31 Drawing Sheets

(51) Int. Cl.

| | |
|---|---|
| ***H01Q 1/42*** | (2006.01) |
| ***H01Q 1/50*** | (2006.01) |
| ***H01Q 15/14*** | (2006.01) |
| ***H01Q 21/06*** | (2006.01) |

(58) Field of Classification Search
CPC .... H01Q 1/1228; H01Q 1/1264; H01Q 1/523; H01Q 3/08; H01Q 9/0414; H01Q 9/045; H01Q 21/24; H01Q 19/104; H01Q 21/0081; H01Q 21/062; H01Q 21/065
See application file for complete search history.

(56) References Cited

FOREIGN PATENT DOCUMENTS

| | | | | | |
|---|---|---|---|---|---|
| JP | H11-511614 | A | | 10/1999 | |
| JP | 2002-261644 | A | | 9/2002 | |
| JP | 2009-159430 | A | | 7/2009 | |
| JP | 2017-152671 | A | | 8/2017 | |
| JP | 2019-134591 | A | | 8/2019 | |
| JP | 2019-536362 | A | | 12/2019 | |
| KR | 10-2019-0118979 | A | | 10/2019 | |
| KR | 10-2019-0126336 | A | | 11/2019 | |
| KR | 20200049620 | A | * | 5/2020 | ............... H01Q 1/02 |
| KR | 10-2020-0132659 | A | | 11/2020 | |
| WO | 2017/098741 | A1 | | 6/2017 | |
| WO | WO-2018093173 | A1 | * | 5/2018 | ............... H01Q 1/12 |
| WO | WO-2019199078 | A1 | * | 10/2019 | ............... H01Q 1/02 |
| WO | 2020/231148 | A1 | | 11/2020 | |

OTHER PUBLICATIONS

Non-final Office Action mailed Nov. 3, 2022 from the Korean Intellectual Property Office for Korean Application No. 10-2021-0168963.
Notice of Allowance mailed May 22, 2023 from the Korean Intellectual Property Office for Korean Application No. 10-2021-0168963.
Non-final Office Action mailed on May 21, 2024 from the Japanese Patent Office for Japanese Application No. 2023-532294.
European Search Report dated Dec. 13, 2024 for EP Patent Application No. 21900979.2.

* cited by examiner

ANTENNA APPARATUS

CROSS-REFERENCE TO RELATED APPLICATIONS

This application is a continuation application of International Application No. PCT/KR2021/017934, filed Dec. 1, 2021, which claims the benefit of Korean Patent Application Nos. 10-2020-0166910, filed Dec. 2, 2020; and 10-2021-0168963, filed Nov. 30, 2021, in the Korean Intellectual Property Office, the disclosures of which are incorporated herein in their entirety by reference.

TECHNICAL FIELD

The present disclosure relates to an antenna apparatus, and more specifically, to an antenna apparatus, which may separate an amplification unit module including an amplification unit substrate on which analog amplification elements are mounted in units of module from a main board and position an amplification unit substrate module on an intermediate outside air layer set to be exposed to outside air on a middle portion between the main board positioned on a front of the antenna apparatus and an RF filter layer on a rear thereof, thereby maximizing heat-dissipation performance.

BACKGROUND ART

Base station antennas in addition to repeaters used in mobile communication systems have various types and structures and generally have a structure in which a plurality of radiating elements are appropriately disposed on at least one reflector that is upright in a longitudinal direction.

Recently, studies are being actively conducted to achieve a compact, lightweight, and low-cost structure while satisfying high-performance requirements for a multiple-input and multiple-output (MIMO)-based antenna. In particular, in the case of an antenna apparatus to which a patch-type radiating element for implementing linear polarization or circular polarization is applied, in general, a method in which a radiating element formed of a dielectric substrate made of a plastic or ceramic material is plated and coupled to a printed circuit board (PCB) or the like through soldering is widely used.

FIG. 1 is an exploded perspective view illustrating one example of an antenna apparatus according to the related art.

As illustrated in FIG. 1, in an antenna apparatus 1 according to the related art, a plurality of radiating elements 35 are arranged at a front surface side of an antenna housing main body 10, which is a beam output direction, so that beams are output in a desired direction to facilitate beam forming, and a radome 50 is mounted on a front end of the antenna housing main body 10 with the plurality of radiating elements 35 interposed therebetween for the protection from an outside environment.

More specifically, the antenna apparatus 1 according to the related art includes the antenna housing main body 10 having an open front surface having a thin rectangular-parallelepiped enclosure shape and having a plurality of heat-dissipation fins 11 integrally formed on a rear surface thereof, a main board 20 stacked on an inner rear surface of the antenna housing main body 10, and an antenna board 30 stacked on an inner front surface of the antenna housing main body 10.

Patch-type radiating elements or dipole-type radiating elements 35 may be mounted on a front surface of the antenna board 30, and the radome 50 for protecting the respective components inside the antenna housing main body 10 from the outside and smoothly radiating beams from the radiating elements 35 may be installed on the front surface of the antenna housing main body 10.

However, in one example (1) of the antenna apparatus according to the related art, since a front portion of the antenna housing main body 10 is provided to be entirely shielded by the single radome 50, the radome 50 becomes a factor that hinders the heat dissipation of the antenna apparatus. Here, when the radome 50 is removed and the radiating elements 35 are exposed to the outside, the antenna board 30 is inevitably exposed to the outside, and thus protection from an external environment is inevitably insufficient.

In addition, there is a problem that it is difficult to change a heat dissipation design in a forward direction in that the antenna board 30 is also made of an FR-4 material, which is a general PCB material having low thermal conductivity and a front of an installation space (not illustrated) in which the main board that is a space with a lot of heat is installed, is completely shielded like the radome 50.

For this reason, since both digital elements and analog amplification elements need to be intensively mounted on the rear surface of the front and rear surfaces of the main board, which is in the direction of heat dissipation and thus a heat-dissipation portion is concentrated, there is a problem that the entire heat dissipation performance of the antenna apparatus 1 is greatly reduced.

DISCLOSURE

Technical Problem

The present disclosure has been made in efforts to solve the problems and is directed to providing an antenna apparatus, which may arrange an amplification unit module including an amplification unit substrate on which analog amplification elements are mounted on an intermediate outside air layer set between a main body module provided with a main board, which is positioned on a rear of the antenna apparatus, and an RF module positioned on a front thereof so as to be exposed to outside air, thereby dissipating system driving heat to be distributed in a front-rear direction and greatly improving heat-dissipation performance.

In addition, the present disclosure is directed to providing an antenna apparatus capable of reducing interference between feed lines having an air-strip structure and radiating elements and horizontally arranging antennas.

The technical objects of the present disclosure are not limited to the above-described objects, and other technical objects that are not mentioned will be able to be clearly understood by those skilled in the art from the following description.

Technical Solution

In accordance with one embodiment of the present disclosure, an antenna apparatus includes a main body module in which a main board is embedded, a radio frequency (RF) module fixed to a front of the main body module so that an intermediate outside air layer is formed between the main body module and the RF module and having an RF filter unit and an antenna element unit embedded therein, and an amplification unit module disposed to be exposed to the intermediate outside air layer between the main body module and the RF module and including an amplification unit substrate on which analog amplification elements are mounted, wherein heat generated from heating elements mounted on the main board is dissipated through at least any one of the front and a rear of the main body module, and heat generated from the amplification unit module is directly dissipated through the intermediate outside air layer.

Here, the antenna apparatus may further include a rear housing in which an inner space having an open front portion is formed so that a rear surface of the main board is closely seated, and a front housing coupled to a front end of the rear housing and coupled to shield the inner space, wherein a power supply unit (PSU) board having a front surface matched with a front surface of the main board and a surge substrate unit disposed to be spaced by a predetermined distance rearward from the rear surface of the main board are seated in the inner space separately from the main board.

In addition, a plurality of front housing heat-dissipation fins for dissipating the heat generated from the heating elements mounted on front surfaces of the main board or the PSU board to the intermediate outside air layer may be integrally formed on a front surface of the front housing.

In addition, the amplification unit module may be coupled to the main board by a male socket portion provided on a rear end of the amplification unit substrate in a socket pin connection manner and coupled to the RF filter unit by a through-pin terminal provided on a front end of the amplification unit substrate in a feed through-pin connection manner.

In addition, the antenna apparatus may further include a finger guard panel configured to partition the intermediate outside air layer between the main body module and the RF module from an outer space and formed with a plurality of airflow holes through which outside air of the outer space flows into the intermediate outside air layer or inside air of the intermediate outside air layer flows out to the outer space.

In addition, the main body module and the RF module may be provided to be spaced apart from each other in a front-rear direction with the amplification unit module interposed therebetween, and the finger guard panel may have a front end coupled to the RF module and a rear end coupled to the main body module to partition the intermediate outside air layer between the main body module and the RF module from the outer space.

In addition, the finger guard panel may be provided to partition four surfaces forming the intermediate outside air layer from the outer space.

In addition, the finger guard panel may be formed to be rounded to the outside.

In addition, the finger guard panel may be formed so that an outer surface connecting a front end or a rear end and an outer surface connecting a left end or a right end have a rounded surface.

In addition, the RF module may include a front antenna housing stacked and coupled to a front of the amplification unit module and having the RF filter unit and the antenna element unit embedded therein, and a radome panel coupled to a front end of the front antenna housing to protect the RF filter unit and the antenna element unit from the outside, and the radome panel is waterproofly coupled to the front antenna housing.

In addition, the RF filter unit may be formed of a cavity filter including at least one cavity.

In addition, the antenna element unit may include a plurality of radiating elements disposed to extend vertically, and a plurality of feed lines having an air-strip structure as feed lines formed to supply a power to the plurality of radiating elements.

In addition, the plurality of radiating elements may be formed of any one of a plurality of dipole-type radiating elements and patch-type radiating.

In addition, the RF module may further include a reflector panel disposed inside the front antenna housing and configured to layer-partition the RF filter unit and the antenna element unit, and the plurality of feed lines are electrically connected to the RF filter unit by passing through the reflector panel.

In addition, when the plurality of radiating elements are formed of patch-type radiating elements, the antenna element unit may include a plurality of patch base portions assembled to be vertically spaced by a predetermined distance from each other on a front surface of the reflector panel, a plurality of patch-type radiating elements seated on a front surface of each of the plurality of patch base portions, and the plurality of feed lines electrically connected to each of the plurality of patch-type radiating elements.

In addition, the plurality of patch base portions may be hook-assembled to the reflector panel, and the plurality of feed lines may be inserted into and seated on assembly guide slits formed in the plurality of patch base portions.

In addition, the plurality of patch base portions and the plurality of patch-type radiating elements may be vertically and horizontally arranged side by side, and each of interference prevention ribs configured to reduce signal interference between the plurality of patch-type radiating elements disposed adjacent to each other at least horizontally may be provided to protrude forward from the reflector panel.

Advantageous Effects

According to the RF module for an antenna and an antenna apparatus including the same according to one embodiment of the present disclosure, it is possible to achieve various effects.

First, by spatially separating the heat generated from the heating elements of the antenna apparatus to dissipate the heat of the antenna apparatus to be distributed in the front-rear direction, it is possible to greatly improve heat-dissipation performance.

Second, by positioning the amplification elements related to the RF conventionally intensively mounted at the main board side separately on the intermediate outside air layer between the main board and the RF filter layer and directly exposing the amplification elements to the outside air, thereby greatly improving the overall heat-dissipation performance of the antenna apparatus.

Effects of the present disclosure are not limited to the above-described effects, and other effects that are not mentioned will be able to be clearly understood by those skilled in the art from the following description.

DESCRIPTION OF REFERENCE NUMERALS

Figure 1:
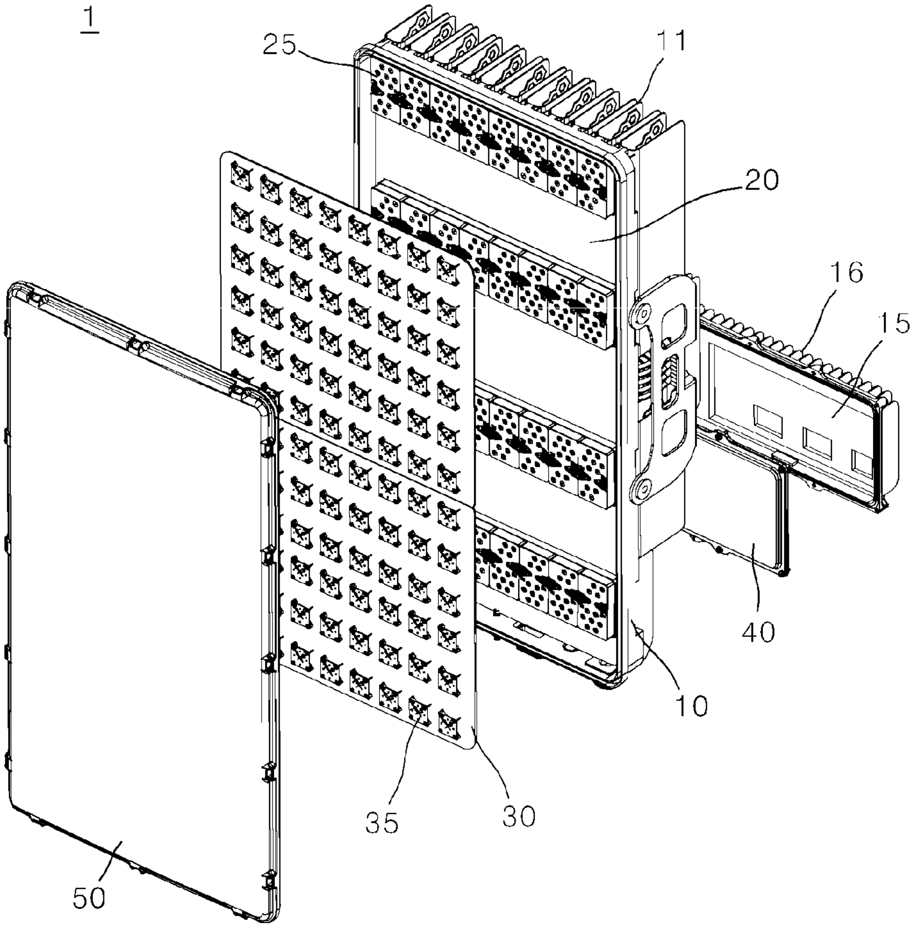
FIG. 1 is an exploded perspective view illustrating one example of an antenna apparatus according to the related art.

100: Main body module 110: Rear housing
110S: Inner space 111: Rear heat-dissipation fin
115: Handle unit 117: Bolt fastening hole
120: Front housing 130: Main board
140: PSU board unit 150: Surge substrate unit
200: Amplification unit module 210S: Substrate seating space
220: Amplification unit body 230: Amplification unit substrate
240: Amplification unit cover 300: RF module
310: Front antenna housing 320: Radome panel
330: RF filter unit 340: Antenna element unit
350: Reflector panel 400: Finger guard panel
500: Clamping unit 600: Outer mounting member
MS: Intermediate outside air layer OS: Outer space

MODE FOR INVENTION

Hereinafter, an antenna apparatus according to one embodiment of the present disclosure will be described in detail with reference to the accompanying drawings.

In adding reference numerals to components in each drawing, it should be noted that the same components have the same reference numerals as much as possible even when they are illustrated in different drawings. In addition, in describing embodiments of the present disclosure, the detailed description of related known configurations or functions will be omitted when it is determined that the detailed description obscures the understanding of the embodiments of the present disclosure.

The terms such as first, second, A, B, (a), and (b) may be used to describe components of the embodiments of the present disclosure. The terms are only for the purpose of distinguishing a component from another, and the nature, sequence, order, or the like of the corresponding component is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

Figure 2A:
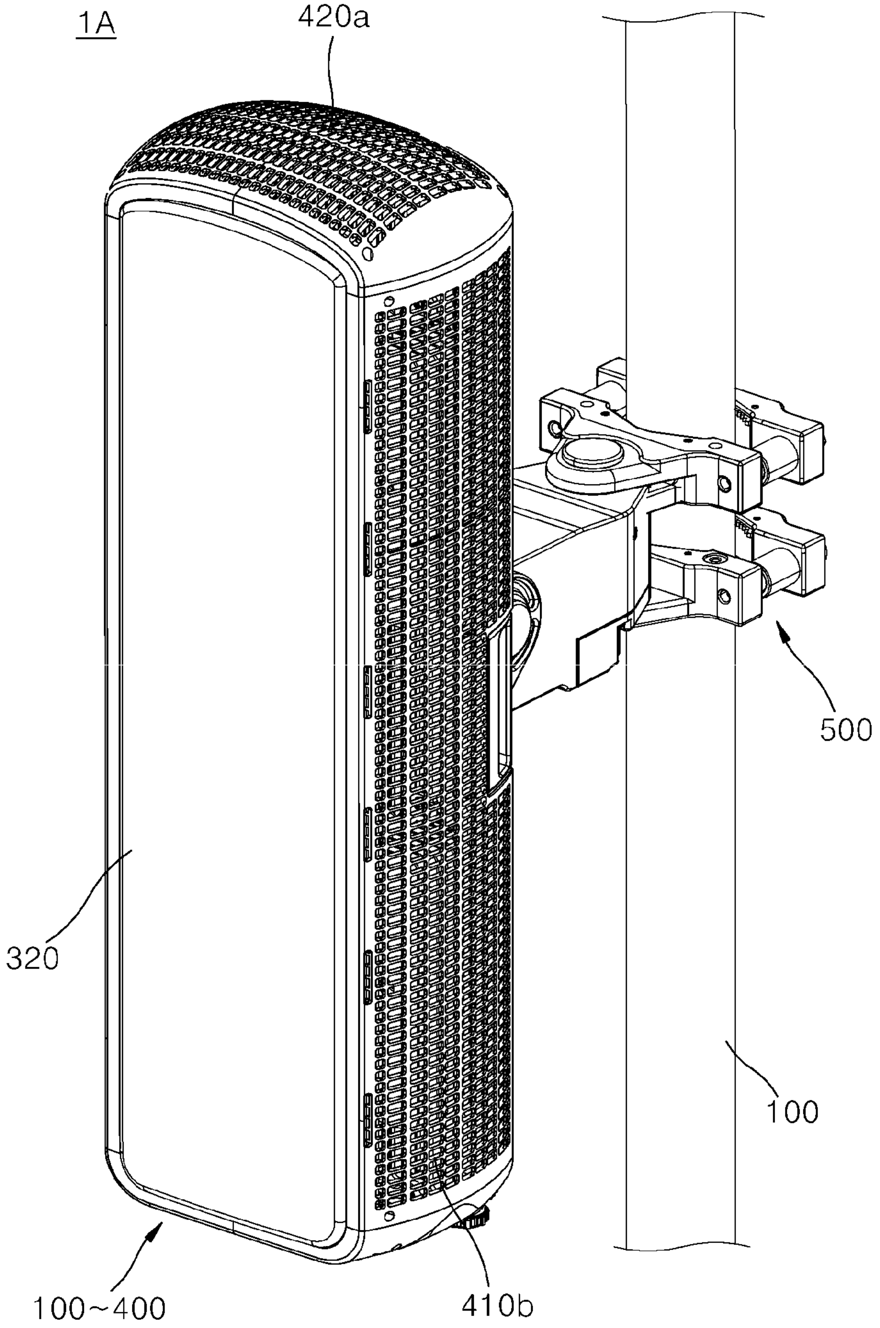
FIGS. 2A and 2B are a perspective view of a front portion of an antenna apparatus and a perspective view of a rear portion thereof illustrating an installation state of a support pole of the antenna apparatus according to one embodiment of the present disclosure.
Figure 2B:
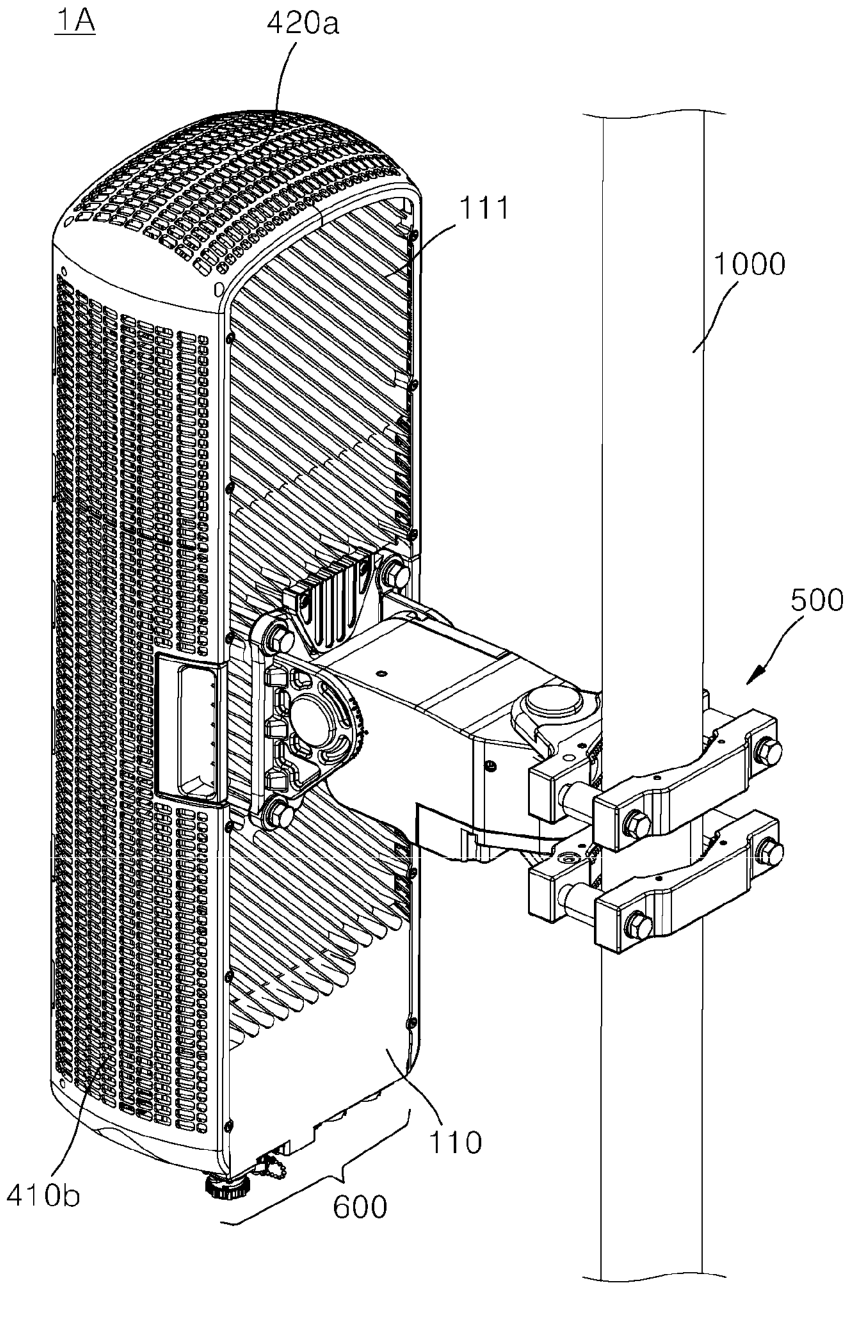
Figure 3A:
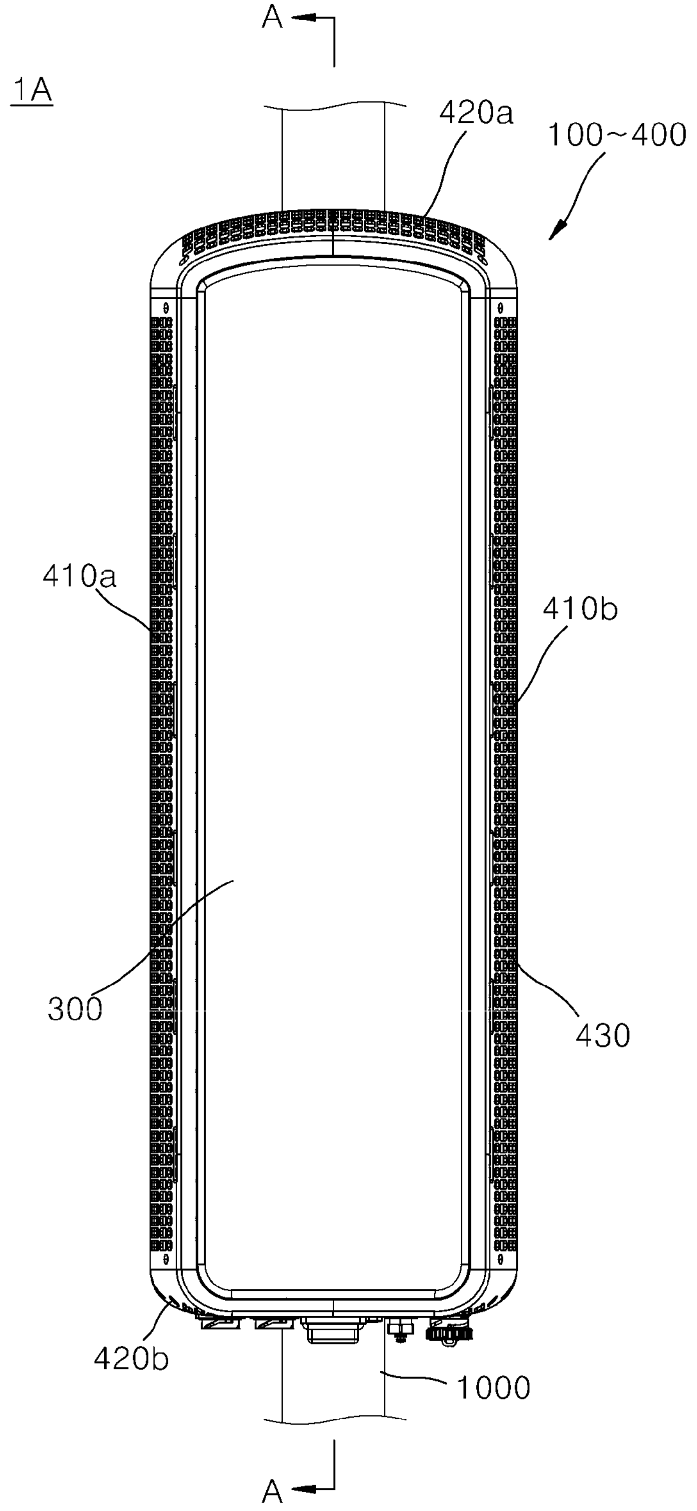
FIG. 3A is a front view of FIG. 2A.
Figure 3B:
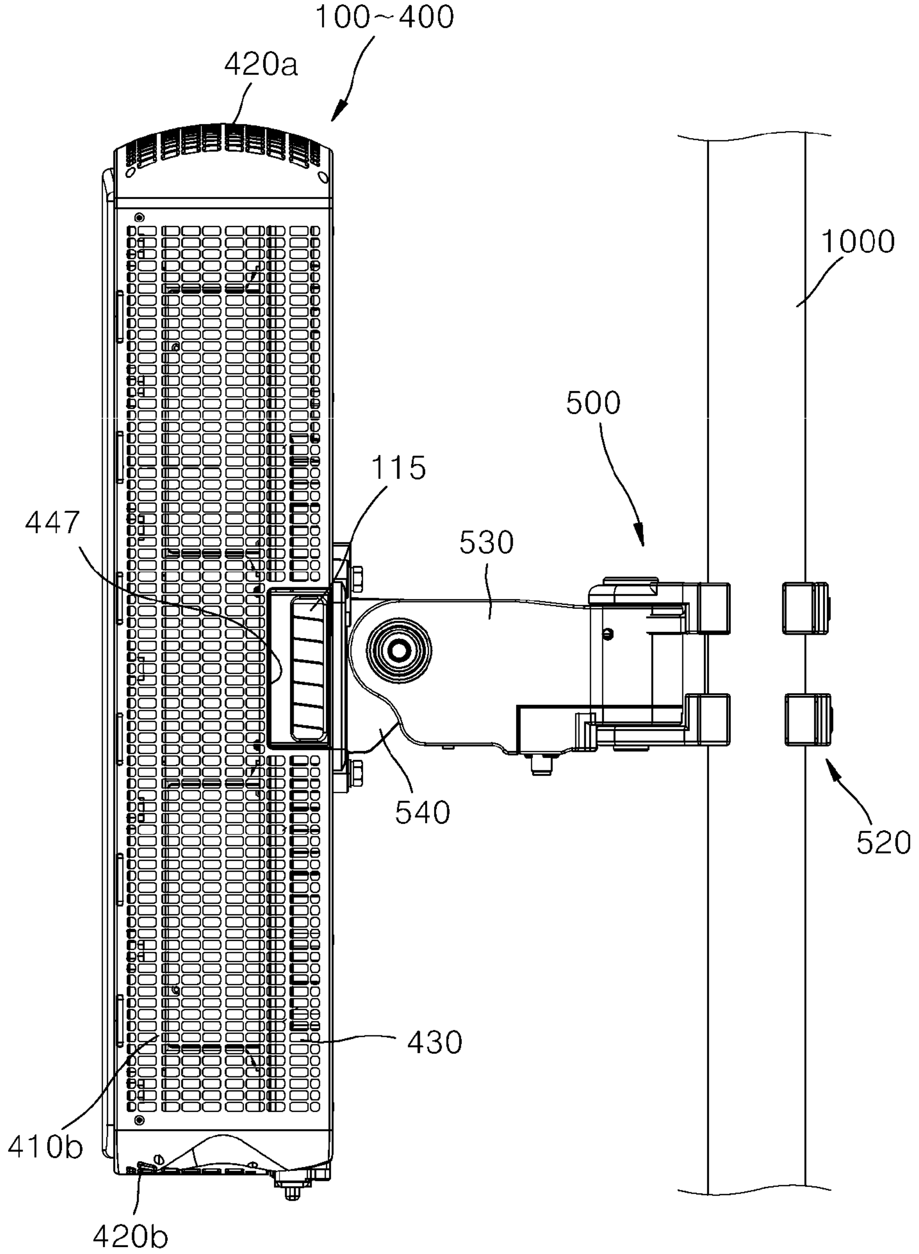
FIG. 3B is a side view of FIG. 2A.
Figure 4A:
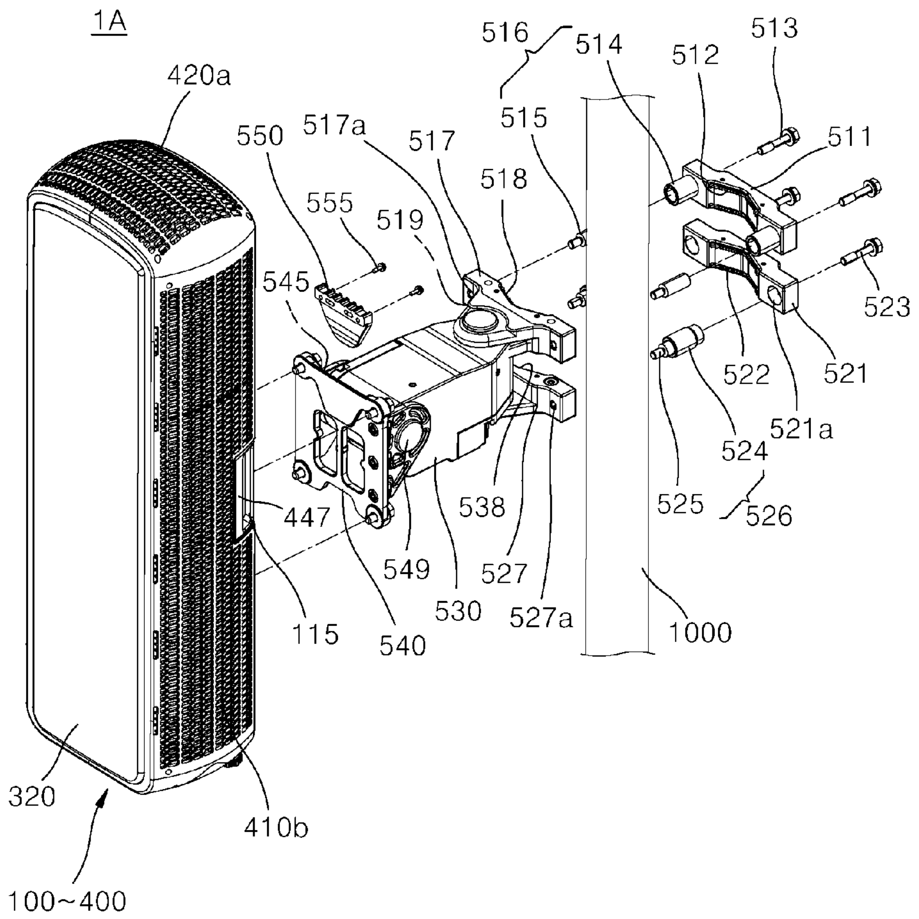
FIGS. 4A and 4B are exploded perspective views of FIGS. 2A and 2B and are an exploded perspective view of a front portion of a clamping unit and an exploded perspective view of a rear portion thereof among components of FIGS. 2A and 2B.
Figure 4B:
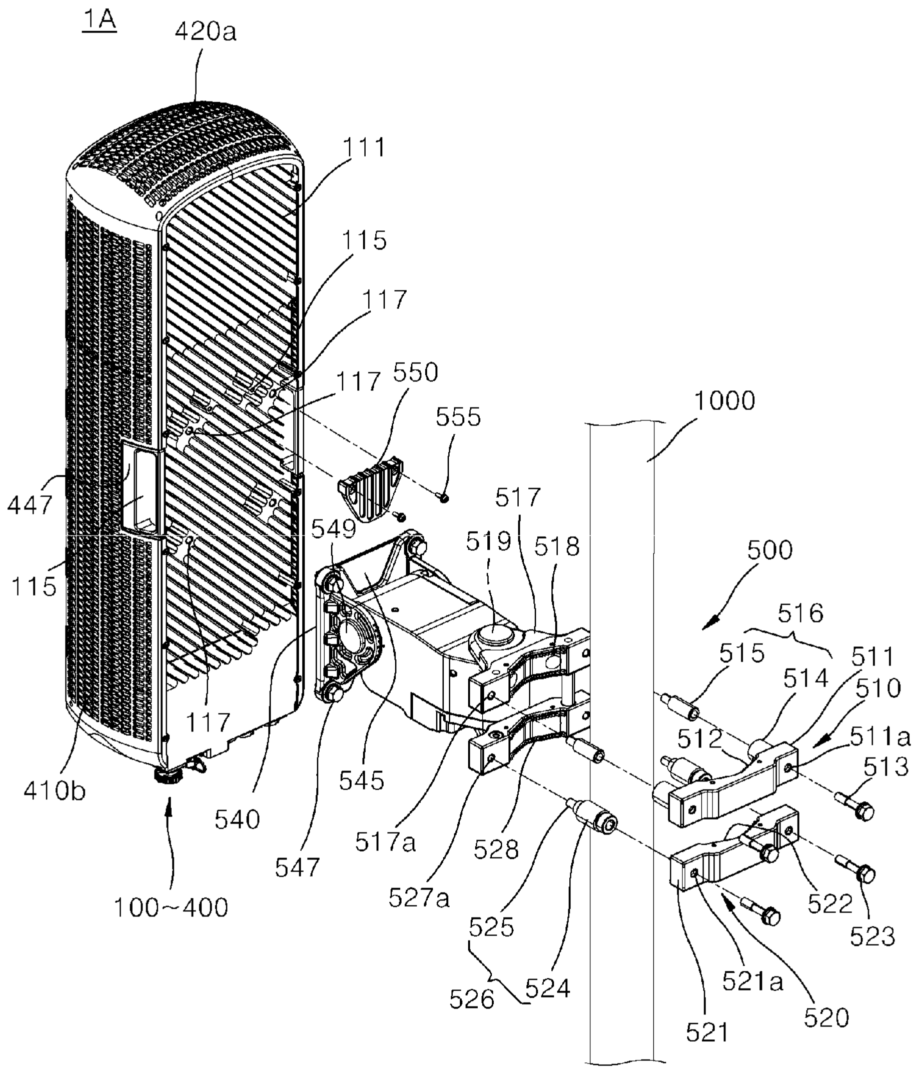

FIGS. 2A and 2B are a perspective view of a front portion of an antenna apparatus and a perspective view of a rear portion thereof illustrating an installation state of a support pole of the antenna apparatus according to one embodiment of the present disclosure, FIG. 3A is a front view of FIG. 2A, FIG. 3B is a side view of FIG. 2A, and FIGS. 4A and 4B are exploded perspective views of FIGS. 2A and 2B and are an exploded perspective view of a front portion of a clamping unit and an exploded perspective view of a rear portion thereof among components of FIGS. 2A and 2B.

As illustrated in FIGS. 2A to 4B, an antenna apparatus 1A according to one embodiment of the present disclosure may be mounted to be vertically tilting-adjusted or horizontally steering-adjusted with respect to a support pole 1000 via a clamping unit 500.

As illustrated in FIGS. 4A and 4B, the clamping unit 500 may include an upper bracket unit 510 relatively positioned at an upper side of the clamping unit 500 as one of a pair of bracket units coupled to the support pole 1000, a lower bracket unit 520 relatively positioned under the upper bracket unit 510 as the other one, a steering unit 530 having a rear end provided on the upper bracket unit 510 and the lower bracket unit 520 to be steering-rotated horizontally, and a tilting unit 540 provided to be vertically tilting-rotated with respect to the steering unit 530.

When a direction in which the antenna apparatus 1A is installed with respect to the support pole 1000 is defined as "front" and an opposite direction thereto is defined as "rear," the upper bracket unit 510 and the lower bracket unit 520 may be composed of rear support brackets 511 and 521 installed on the rear of the support pole 1000 and front support brackets 517 and 527 installed on the front of the support pole 1000.

The rear support brackets 511 and 521 and the front support brackets 517 and 527 may be each formed in a shape surrounding a part of a rear outer circumferential surface of the support pole 1000 and a part of a front outer circumferential surface thereof, and clamp gears 512, 518, 522, and 528 having a serration shape may be formed on the respective inner side surfaces in order to increase a friction force with the support pole 1000.

As illustrated in FIGS. 4A and 4B, the rear support brackets 511 and 521 and the front support brackets 517 and 527 may be fixed to the support pole 1000 by an operation in which a pair of bracket fixing long bolts 513 and 523 are fastened to rear through-holes 511*a* and 521*a* and front fastening holes 517*a* and 527*a*. The pair of bracket fixing long bolts 513 and 523 may be fastened to the rear support brackets 511 and 521 and the front support brackets 517 and 527 by passing through outer bushes 514 and 524 and inner bushes 515 and 525 having front and rear ends connected to each other.

Here, front ends of the front support brackets 517 and 527 may further extend by a predetermined length forward and may be provided with a shaft unit 519 (not illustrated) fitted into and coupled to a rear end of the steering unit 530 from an upper side to a lower side and from the lower side to the upper side, respectively. The steering unit 530 may be provided to have a front end horizontally rotated at a predetermined angle about the shaft units 519 (not illustrated) of the front support brackets 517 and 527, and thus may adjust a horizontal directivity of the antenna apparatus 1A coupled to a front of the steering unit 530.

Meanwhile, the tilting unit 540 may be coupled to the front end of the steering unit 530 so that upper and lower ends may be vertically rotated at a predetermined angle with respect to a tilting shaft 549 to be described below. Since a rear portion of the antenna apparatus 1A according to one embodiment of the present disclosure may be coupled to a front surface of the tilting unit 540, a vertical directivity of the antenna apparatus 1A may be adjusted.

More specifically, the tilting unit 540 may have the front surface in close contact with the rear surface of the antenna apparatus 1A and both left and right ends extending rearward to overlap left and right ends of the steering unit 530 by a predetermined length, and the tilting shaft 549 may be fastened by passing through the front end of the steering unit 530 in the left-right direction.

Although not illustrated in the drawings, a driving component capable of manually adjusting an angle by an operator or a driving component capable of automatically adjusting the angle without a driving force provided by the operator may be provided inside the steering unit 530 and the tilting unit 540.

Meanwhile, the tilting unit 540 may have bracket fastening bolts 547 provided approximately at corners, and the antenna apparatus 1A may be fixed by an operation in which the bracket fastening bolts 547 are fastened to bolt fastening holes 117 formed in a rear surface of a rear housing 110 to be described below of the antenna apparatus 1A.

Here, a latching panel 550 may be coupled to be spaced by a predetermined distance rearward from and parallel to a rear portion of the rear housing 110 to be described below of the antenna apparatus 1A and fixedly latched to a latching groove 545 provided in an upper end of the tilting unit 540. The latching panel 550 may be fixed to the antenna apparatus 1A by an operation in which panel fixing screws 555 pass through two left and right points of an upper end thereof and are fastened to screw fastening holes 115 of the rear housing 110.

As described above, since the antenna apparatus 1A according to one embodiment of the present disclosure may be temporarily fixedly latched to the latching grooves 545 of the tilting unit 540 using the latching panel 550 and then firmly fixed thereto by using the bracket fastening bolts 547 in the coupling process with the clamping unit 500 coupled to the support pole 1000, it is possible to improve the installation operability of the antenna apparatus 1A having a relatively large weight.

Figure 5:
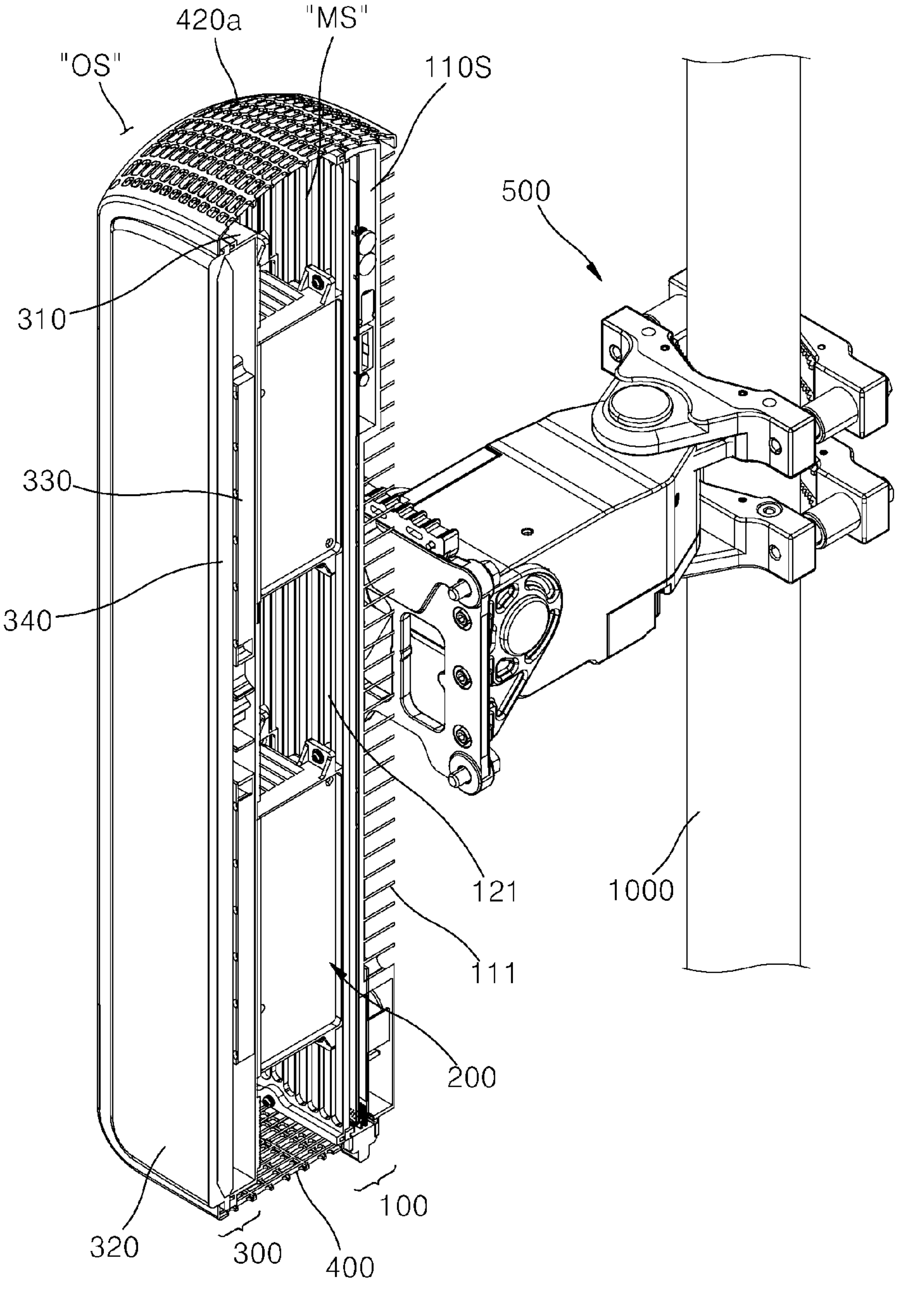
FIG. 5 is a perspective view along line A-A in FIG. 3A.
Figure 6A:
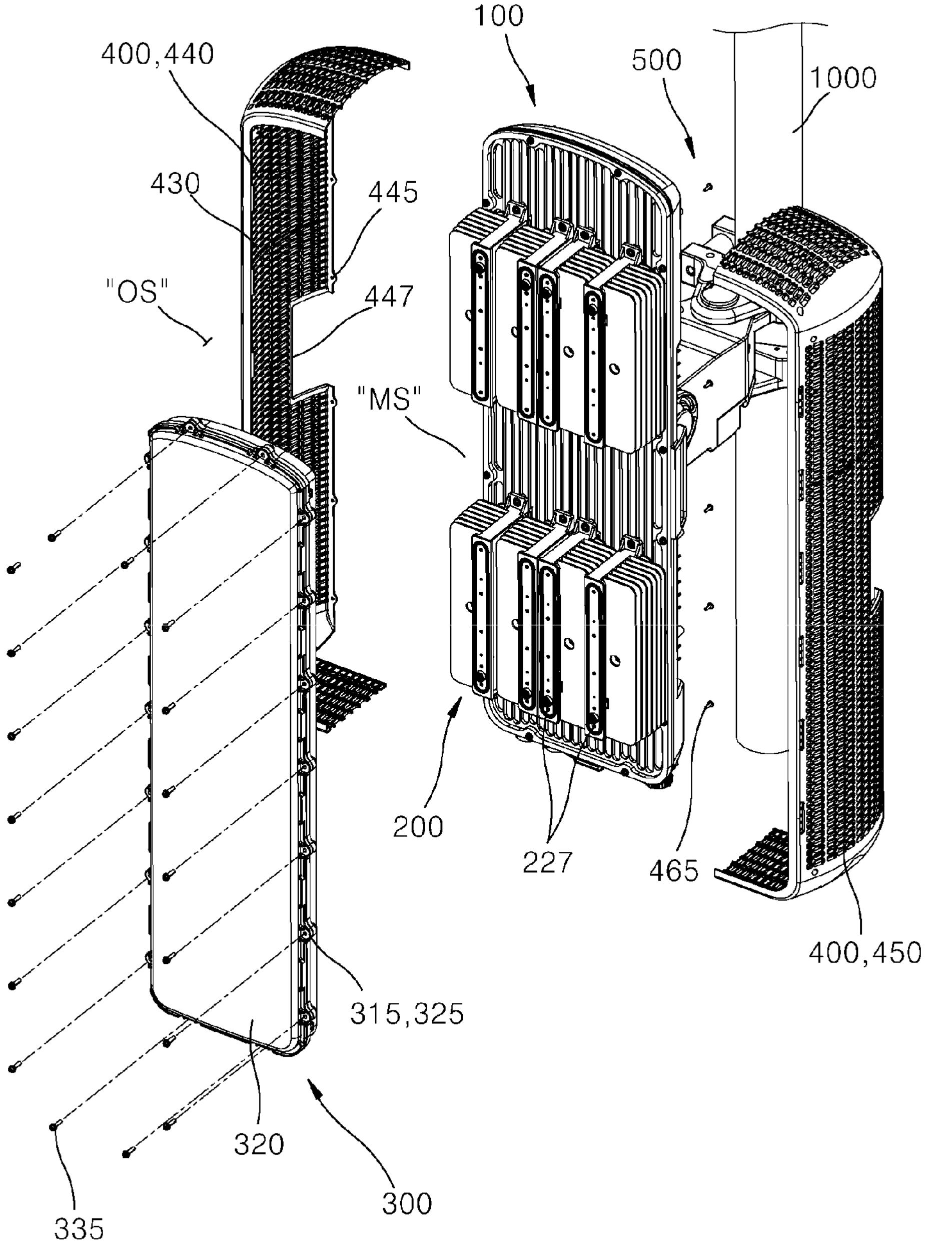
FIGS. 6A and 6B are exploded perspective views illustrating a state in which an RF module and a finger guard panel among the components of FIGS. 2A and 2B have been separated from a main body module.
Figure 6B:
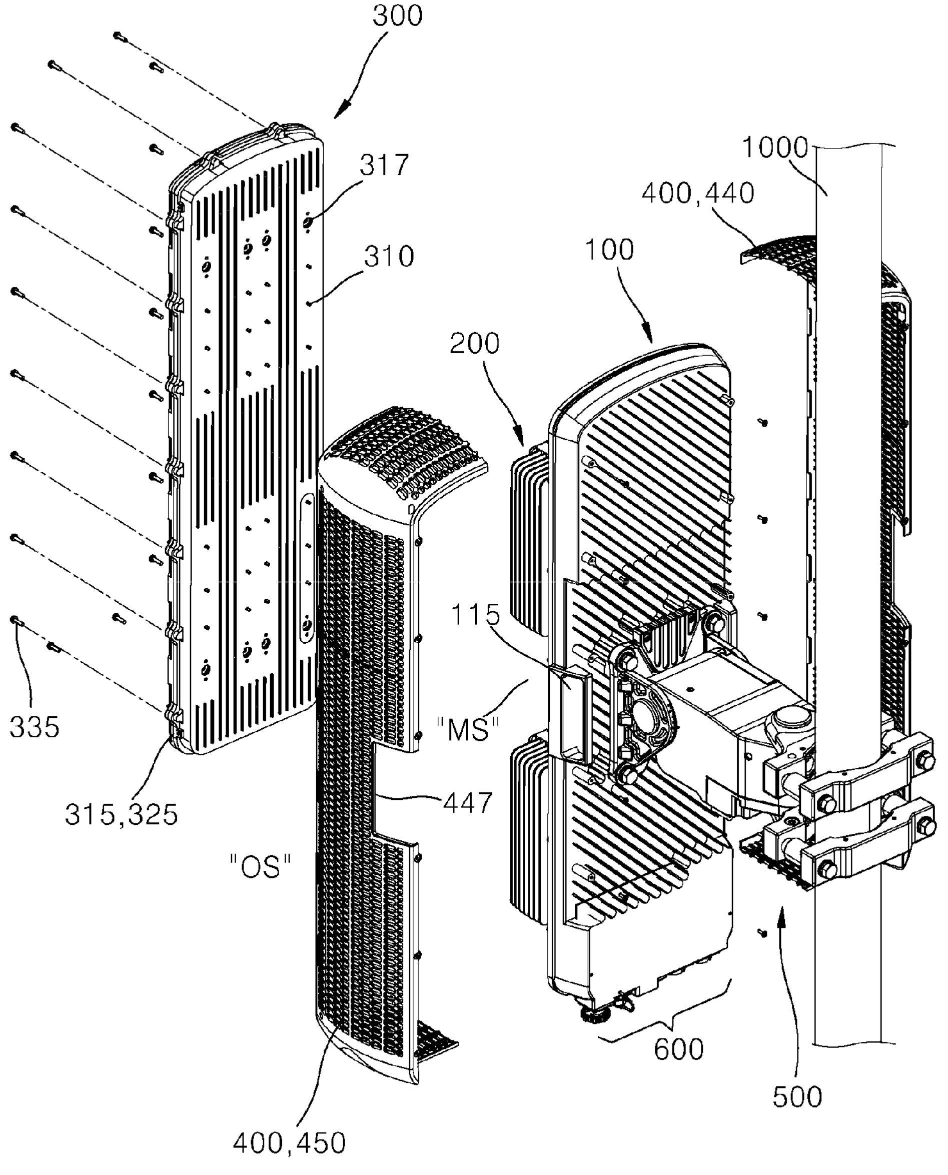
Figure 7A:
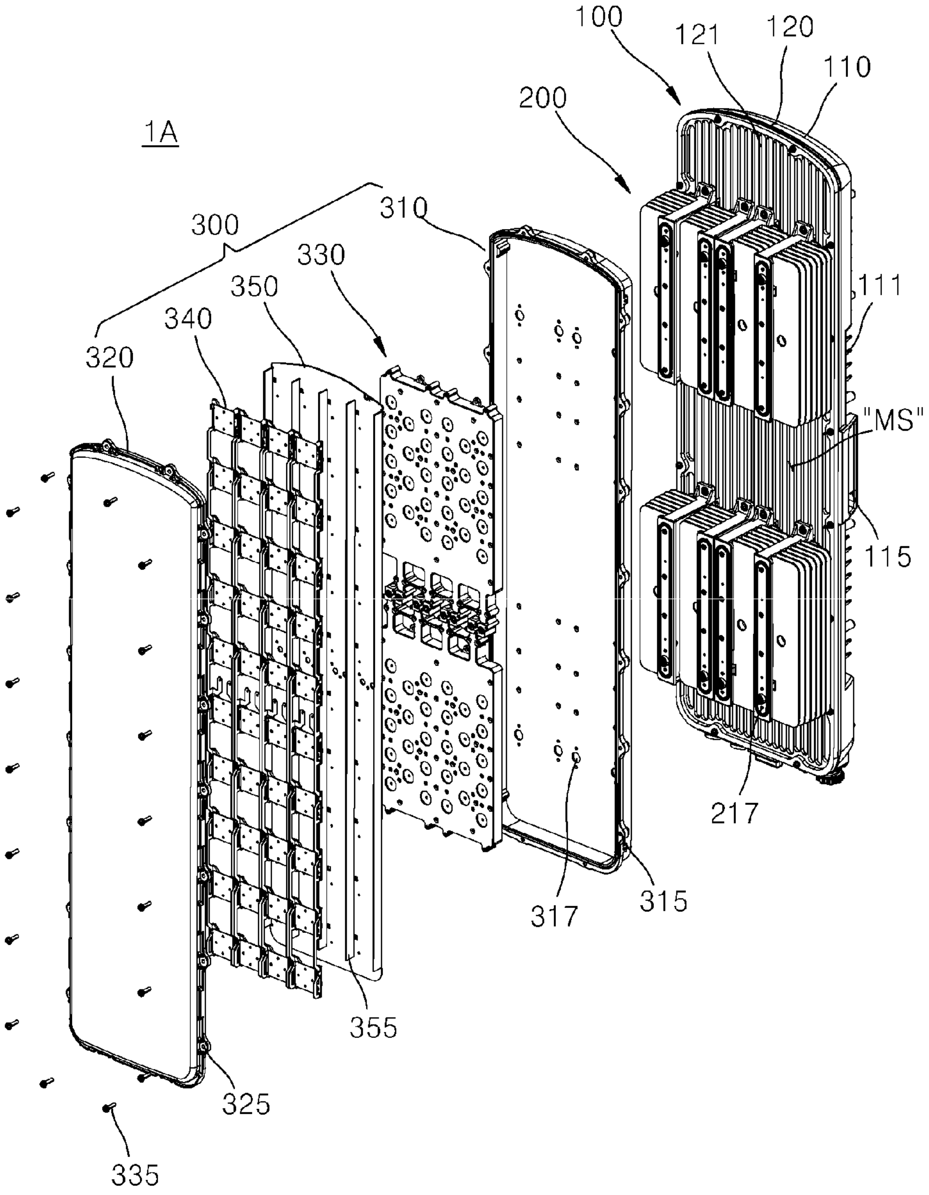
FIGS. 7A and 7B are a perspective view of the entire front portion of the antenna apparatus and a perspective view of the entire rear portion thereof in a state in which the finger guard panel has been removed.
Figure 7B:
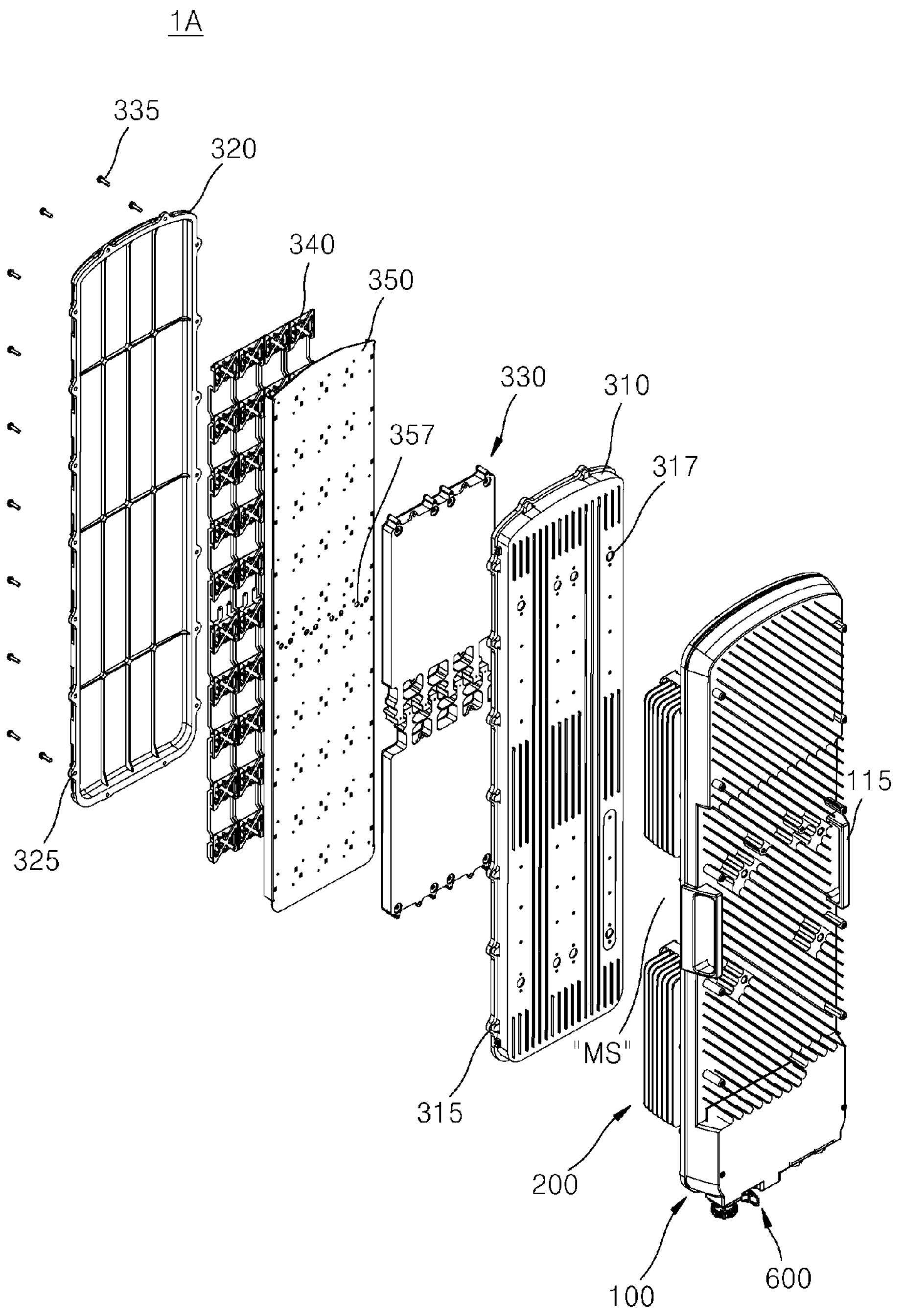
Figure 8:
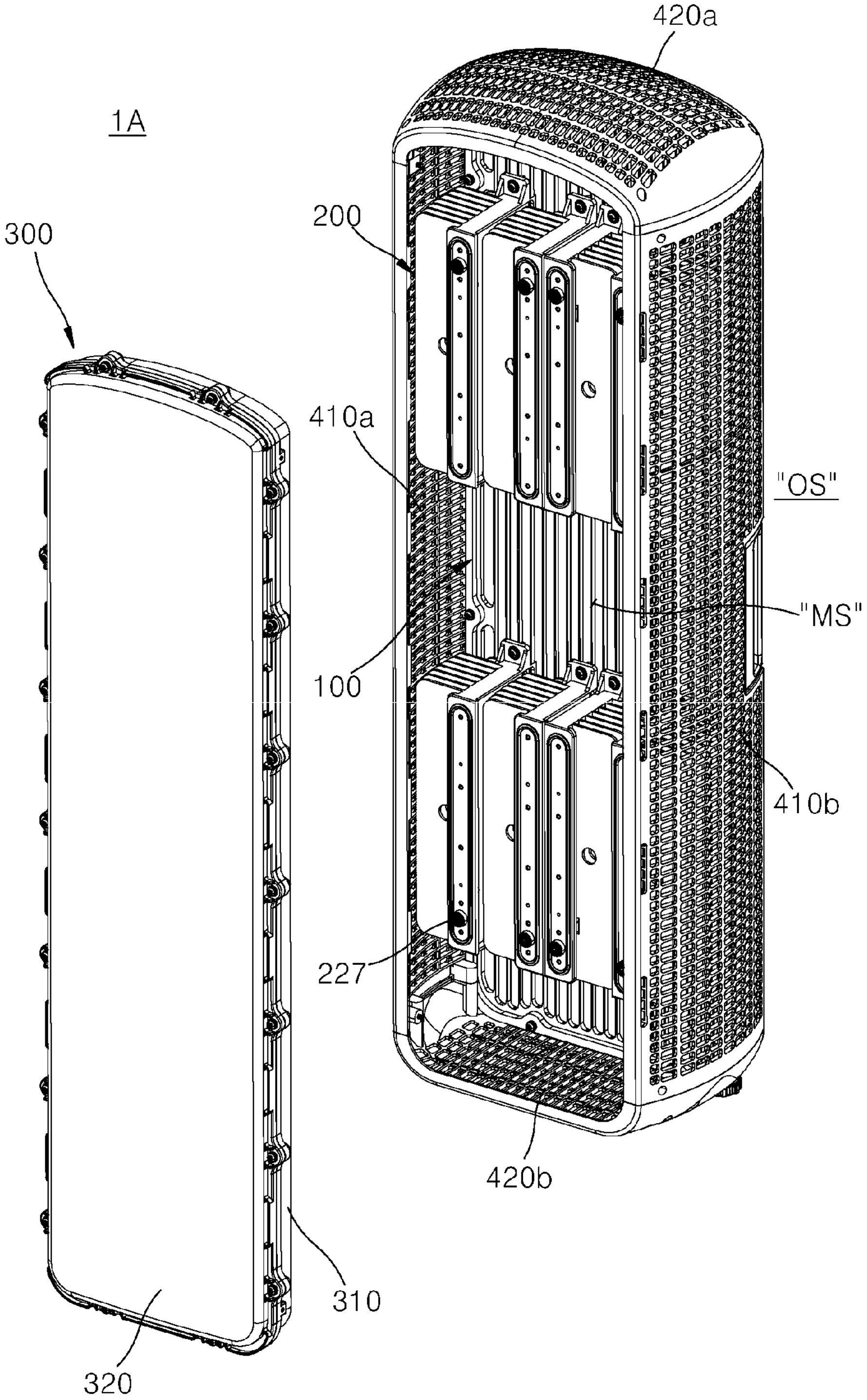
FIG. 8 is an exploded perspective view in which only the RF module is exploded forward in a state in which the finger guard panel is provided.

FIG. 5 is a perspective view along line A-A in FIG. 3A, FIGS. 6A and 6B are exploded perspective views illustrating a state in which an RF module and a finger guard panel among the components of FIGS. 2A and 2B have been separated from a main body module, FIGS. 7A and 7B are a perspective view of the entire front portion of the antenna apparatus and a perspective view of the entire rear portion thereof in a state in which the finger guard panel has been removed, and FIG. 8 is an exploded perspective view in which only the RF module is exploded forward in a state in which the finger guard panel is provided.

Figure 10A:
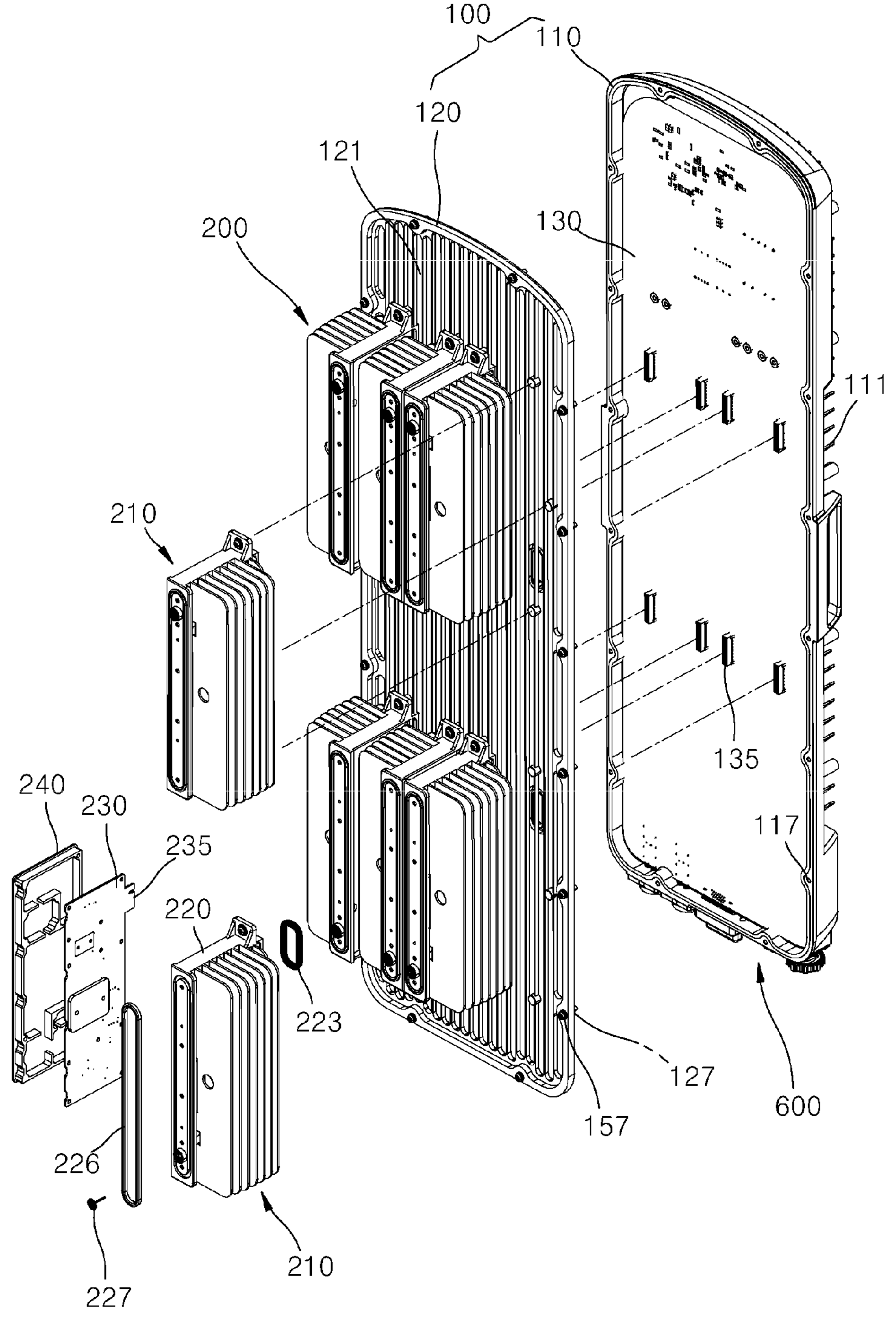
FIGS. 10A and 10B are an exploded perspective view of the front portion of the antenna apparatus and an exploded perspective view of the rear portion thereof for describing a coupling relationship between the front housing and the rear housing and a coupling relationship of an amplification unit module.

As illustrated in FIGS. 2 to 8, the antenna apparatus 1A according to one embodiment of the present disclosure includes a main body module 100 forming a rear exterior of the antenna apparatus 1A, an RF module 300 fixed to a front of the main body module 100 so that an intermediate outside air layer MS is formed between the main body module 100 and the RF module 300, having an RF filter unit 330 and an antenna element unit 340 embedded therein, and forming a part of a front exterior of the antenna apparatus 1A, and an amplification unit module 200 disposed to be exposed to the intermediate outside air layer MS between the main body module 100 and the RF module and including an amplification unit substrate 230 (see FIGS. 10A and 10B to be described below) on which analog amplification elements are mounted.

More specifically, referring to FIG. 5, the main body module 100 among the components of the antenna apparatus 1A may be fixedly installed on the front surface of the tilting unit 540 of the clamping unit 500, the RF module 300 may be installed to be spaced by a predetermined distance forward from the main body module 100 to form the intermediate outside air layer MS between the main body module 100 and the RF module 300, and the amplification unit module 200 may be positioned on the intermediate outside air layer MS.

Here, the intermediate outside air layer MS is a portion substantially indicating an outside air space of the front portion of the main body module 100 and is a space in which outside air is introduced through a finger guard panel 400 to be described below or inside air flows out through the finger guard panel 400. As the intermediate outside air layer MS and an outer space OS communicate with each other, heat dissipated to the intermediate outside air layer MS may be easily discharged to the outer space OS.

In addition, the amplification unit module 200 may have a rear end electrically connected to a main board 130 inside the main body module 100 and a front end electrically connected to the RF filter unit 330 of the RF module 300.

Meanwhile, the antenna apparatus 1A according to one embodiment of the present disclosure may further include the finger guard panel 400 for partitioning the intermediate outside air layer MS between the main body module 100 and the RF module 300 from the outer space OS and formed with a plurality of airflow holes 430 in which the outside air of the outer space OS flows into the intermediate outside air layer MS or the inside air of the intermediate outside air layer MS flows out to the outer space OS.

As illustrated in FIGS. 6A and 6B, the finger guard panel 400 may be provided to have a front end coupled to the RF module 300 and a rear end coupled to the main body module 100 to partition the intermediate outside air layer MS between the main body module 100 and the RF module 300 from the outer space OS. For example, the finger guard panel 400 may be formed with a plurality of screw fastening holes 445 along an edge of the rear end thereof and fastened to an edge end of the main body module 100 by a plurality of fixing screws 465.

As illustrated in FIGS. 5 to 8, the finger guard panel 400 may be provided to partition four surfaces forming the intermediate outside air layer MS from the outer space OS.

Here, as illustrated in FIGS. 2A to 5, the finger guard panel 400 may be formed of four panels of a left finger guard panel 410*a*, a right finger guard panel 410*b*, an upper finger guard panel 420*a*, and a lower finger guard panel 420*b* to partition each surface of the intermediate outside air layer MS.

However, the finger guard panel 400 should not be necessarily formed of four panels, and as illustrated in FIGS. 6A to 8, may be formed of two panels of a one side finger guard panel 440 for partitioning a left side and upper and lower portions with respect to a middle portion of the intermediate outside air layer MS and the other finger guard panel 450 for partitioning a right side and upper and lower portions with respect to the middle portion of the intermediate outside air layer MS.

Here, the finger guard panel 400 may be formed to be rounded to the outside. More specifically, the finger guard panel 400 may be formed so that an outer surface connecting a front end or a rear end and an outer surface connecting a left end and a right end has a surface that is rounded to the outer space OS side.

Therefore, there is an advantage in that when the outside air of the outer space OS flows from the front side to the rear side of the antenna apparatus 1A and also flows from the rear side to the front side thereof, it is possible to allow the outside air to smoothly flow into the intermediate outside air layer MS and widely securing the entire space of the intermediate outside air layer MS, thereby expanding an installation space of the amplification unit module 200.

Figure 9:
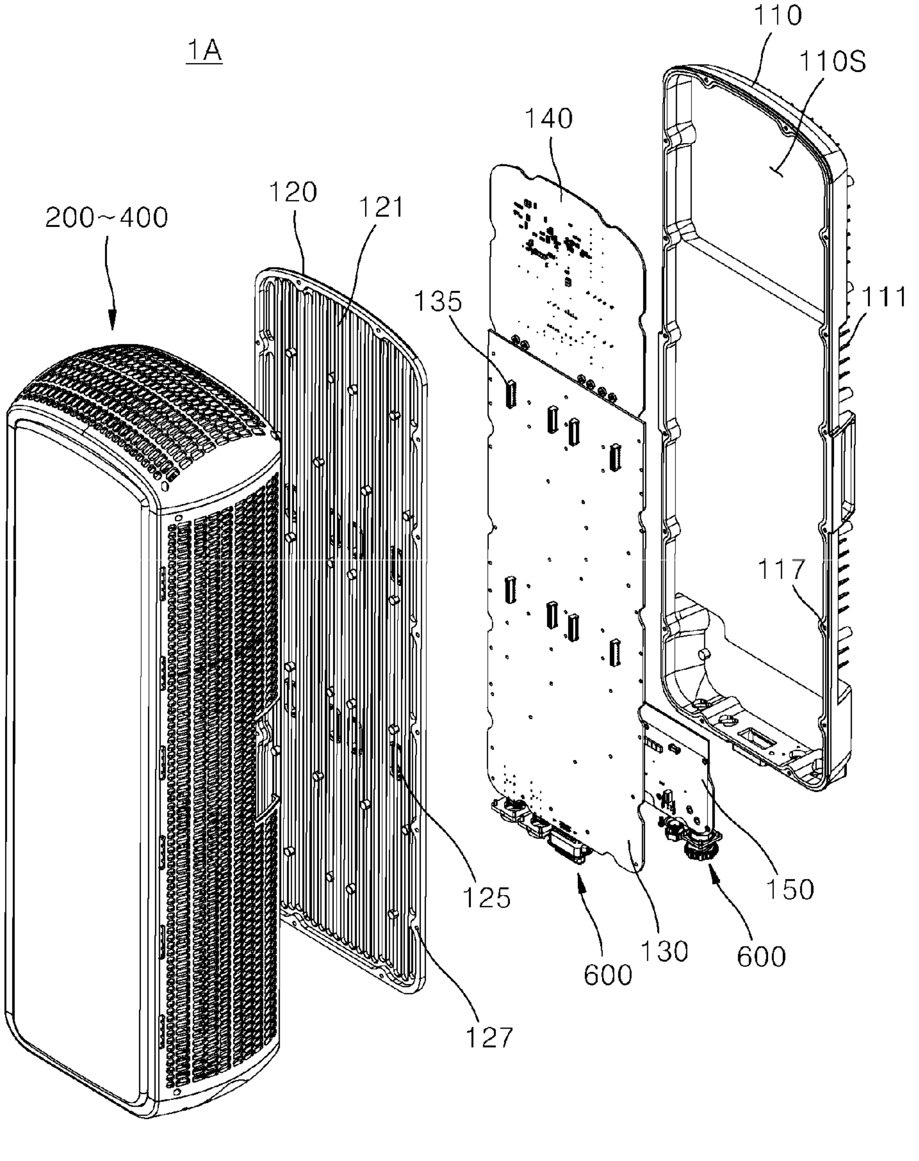
FIG. 9 is an exploded perspective view illustrating an installation state of a main board or the like in an inner space between a front housing and a rear housing among the components of FIGS. 2A and 2B.

FIG. 9 is an exploded perspective view illustrating an installation state of a main board or the like in an inner space between a front housing and a rear housing among the components of FIGS. 2A and 2B, and FIGS. 10A and 10B are an exploded perspective view of the front portion of the antenna apparatus and an exploded perspective view of the rear portion thereof for describing a coupling relationship between the front housing and the rear housing and a coupling relationship of an amplification unit module.

Figure 10B:
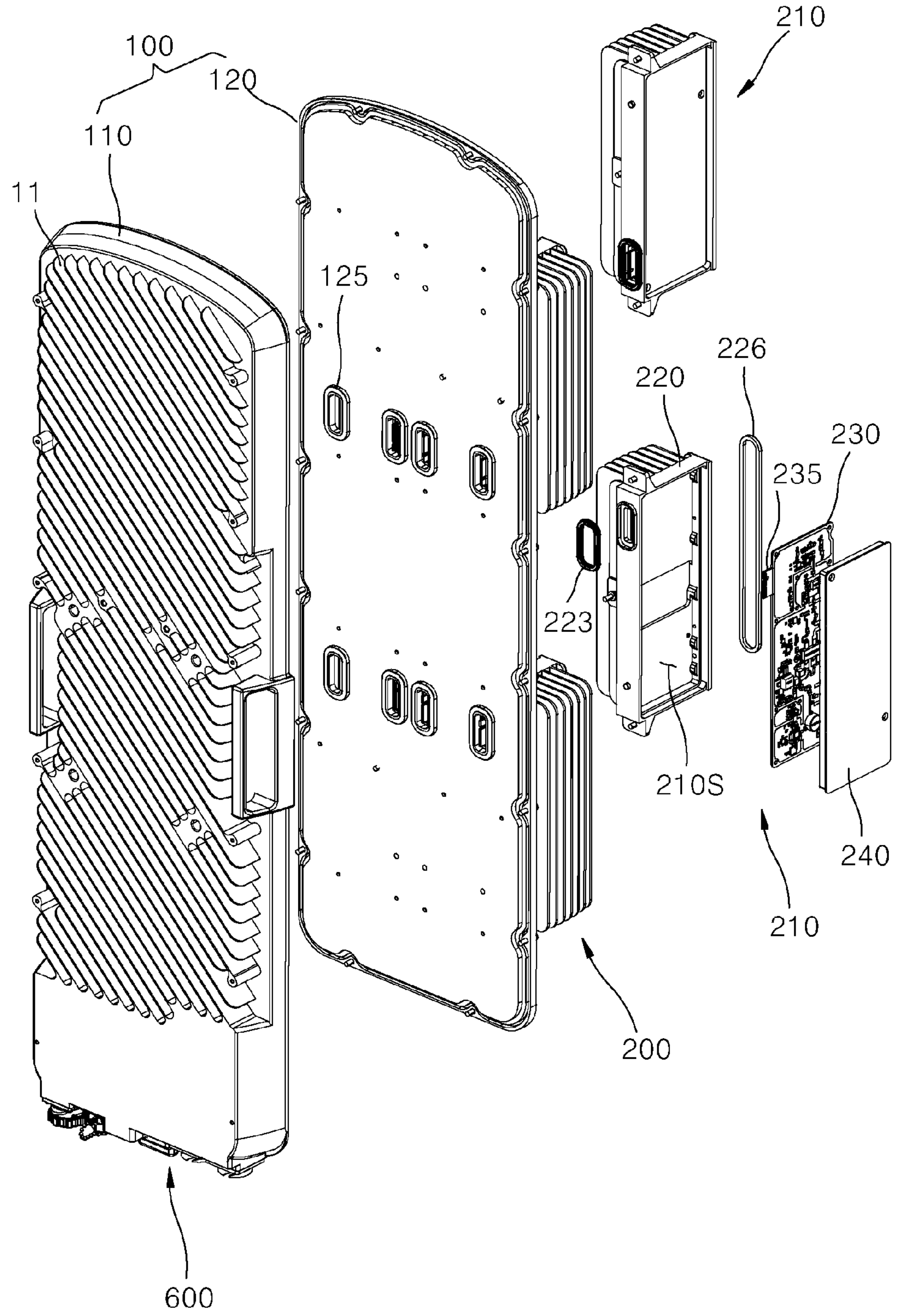

As illustrated in FIGS. 9 to 10B, the main body module 100 may include the rear housing 110 forming the rear exterior of the antenna apparatus 1A and having an open front surface in a thin enclosure shape, and a front housing 120 coupled to shield the open front surface of the rear housing 110 to form an inner space 110S between the rear housing 110 and the front housing 120.

In addition, as illustrated in FIG. 9, the main body module 100 may further include the main board 130 closely installed in the inner space 110S between the rear housing 110 and the front housing 120, a power supply unit (PSU) board unit 140 disposed at an upper side of the main board 130, and a surge substrate unit 150 disposed to be further spaced apart rearward from the main board 130.

The rear housing 110 may be, in particular, a component forming the rear exterior of the antenna apparatus 1A and coupled to the clamping unit 500 provided to mediate the installation to the support pole 1000 of the antenna apparatus 1A.

The rear housing 110 and the front housing 120 are made of a metal material having excellent thermal conductivity so that heat dissipation by thermal conduction is advantageous as a whole, formed in a rectangular-parallelepiped enclosure shape having a small thickness substantially in a front-rear direction, and in particular, formed to have an open front surface of the rear housing 110 to form a predetermined inner space 110S, and thus function to mediate the installation of the main board 130 on which a digital element (e.g., a field programmable gate array (FPGA) element) is mounted, the PSU board unit 140 on which PSU elements are mounted, and the surge substrate unit 150 on which surge component elements are mounted.

Meanwhile, although not illustrated in the drawings, the inner surface of the rear housing 110 may be formed in a shape that is conformable to an outer protrusion shape by the digital element (FPGA element or the like) mounted on the rear surface of the main board 130 and/or the PSU elements or the like mounted on the rear surface of the PSU board unit 140, and the surge component elements mounted on the rear surface of the surge substrate unit 150. This is for maximizing heat-dissipation performance by maximally increasing a thermal contact area with the rear surfaces of the main board 130, the PSU board unit 140, and the surge substrate unit 150.

Handle portions 115 that may be gripped by an operator on site to facilitate the transfer of the antenna apparatus 1A according to one embodiment of the present disclosure or the manual mounting to the clamping unit 500 coupled to the support pole 1000 may be further installed on both the left and right sides of the rear housing 110. Here, the handle portion 115 may be rotatably provided through a handle groove 445 formed to avoid interference with the finger guard panel 400.

In addition, various outer mounting members 600 for cable connections with a base station apparatus (not illustrated) and coordination of internal components may be assembled by passing through an outside of a lower end of the rear housing 110. The outer mounting members 600 are provided in the form of at least one optical cable connection terminal (socket), and each connection terminal may be connected to a connection terminal of a coaxial cable (not illustrated).

A plurality of rear heat-dissipation fins 111 may be integrally formed to have a predetermined pattern shape on the rear surface of the rear housing 110. Here, heat generated by each of heating elements of the main board 130, the PSU board 140, and the surge substrate unit 150 installed in the inner space 110S of the rear housing 110 may be directly dissipated rearward through the plurality of rear heat-dissipation fins 111.

As illustrated in FIGS. 6B and 7B, the plurality of rear heat-dissipation fins 111 may be provided in a shape that is inclined at a predetermined angle upward from one side or upward from the other side. Therefore, the plurality of rear heat-dissipation fins 111 may be designed so that the heat dissipated to the rear of the rear housing 110 is quickly dissipated through updraft formed along each of the rear heat-dissipation fins 111 having the inclined shape of the rear housing 110.

Meanwhile, although not illustrated in the drawings, the main board 130 and the PSU board unit 140, and the main board 130 and the surge substrate unit 150 may be electrically connected via at least one bus bar.

Here, since the PSU board unit 140 may be disposed in the form of being in direct contact with the upper end of the main board 130, the PSU board unit 140 and the main board 130 may be electrically connected via a short type bus bar. In addition, since the surge substrate unit 150 may be disposed to be spaced by a predetermined distance rearward from the main board 130, the surge substrate unit 150 and the main board 130 may be electrically connected via a bent type bus bar.

As illustrated in FIGS. 6A to 8, the front housing 120 may perform a thermal blocking function of partitioning the main board 130, the PSU board 140, the surge substrate unit 150, and the intermediate outside air layer MS positioned on the front of the front housing 120, which are installed and seated in the inner space 110S of the rear housing 110.

Here, it is preferable to understand that the meaning of "thermal blocking" is that the heat generated from the amplification unit module 200 positioned on the intermediate outside air layer MS defined by the front surface of the front housing 120 is blocked from entering a rear surface space of the front housing 120 (i.e., the inner space 110S side of the rear housing 110).

A plurality of front heat-dissipation fins 121 may be integrally formed on the front surface of the front housing 120. Since the front housing 120 and the plurality of front heat-dissipation fins 121 may be made of a metal material having excellent thermal conductivity, the heat of the inner space 110S of the rear housing 110 may be easily dissipated forward in a thermal conduction manner via the front housing 120.

In addition, as illustrated in FIG. 6, the antenna apparatus 1A according to one embodiment of the present disclosure may further include at least one ventilation panel 120 (120*a* to 120*d*). Front ends of the plurality of RF modules 200 are positioned to be further spaced apart forward from an edge of the front housing 120, and the at least one ventilation panel 120 (120*a* to 120*d*) may be coupled to an edge portion of the front housing 120 and coupled in the form of surrounding side portions of the plurality of RF modules 200 disposed at an outermost portion of the antenna apparatus 1A.

As described above, the heat generated from each of the heating elements mounted on the main board 130, the PSU board unit 140, and the surge substrate unit 150, which are provided in the inner space 110S between the rear housing 110 and the front housing 120, may be dissipated through at least any one of the front and rear of the main body module 100. In addition, since the amplification unit module 200 is provided to be directly exposed to the intermediate outside air layer MS as will be described below, the heat generated from the amplification unit module 200 may be cooled through direct heat dissipation to the intermediate outside air layer MS.

Referring to FIGS. 9 to 10B, the amplification unit module 200 may be coupled to the main board 130 via the front housing 120 for each unit module in a socket pin connection manner.

To this end, as illustrated in FIGS. 9 to 10B, a socket through-hole portion 125 may be formed to pass through the front housing 120 in a front-rear direction, and a surface-contact portion (not illustrated) may be formed around the socket through-hole portion 125. A rear side foreign substance inflow prevention ring 223 may be interposed in the surface-contact portion to prevent foreign substances from flowing into the inner space 110S side through the socket through-hole portion 125.

In addition, a rear surface of the RF module 300 may be coupled to be stacked on a front end of the amplification unit module 200, and a front side foreign substance inflow prevention ring 226 may be interposed between the amplification unit module 200 and the RF module 300 to prevent foreign substances from flowing into each of the amplification unit module 200 and the RF module 300 through through-pin connection holes 317 provided for electrical connection.

Figure 11A:
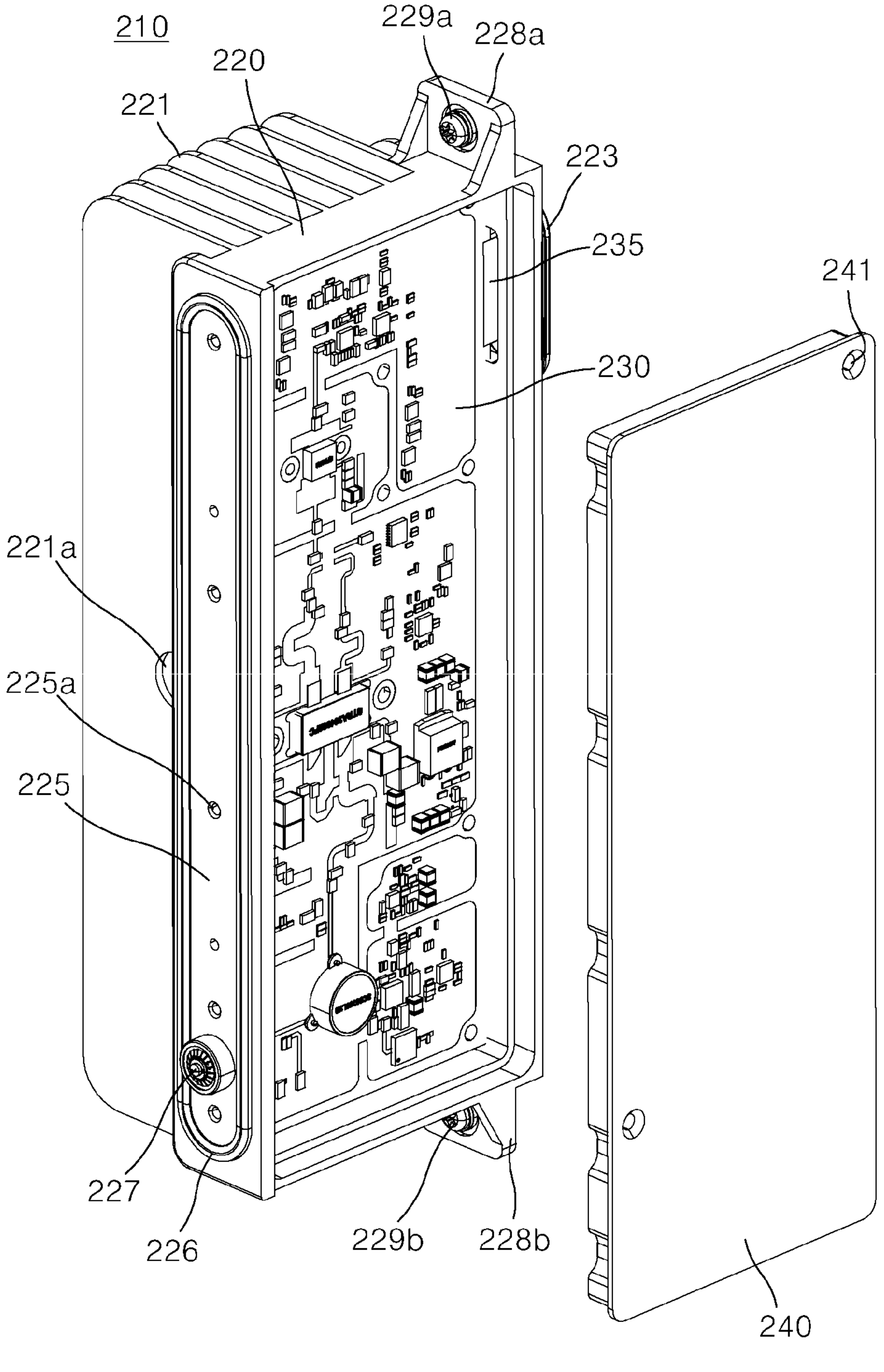
FIGS. 11A and 11B are exploded perspective views illustrating an amplification unit substrate of the amplification unit module positioned on an intermediate outside air layer among the components of FIG. 2.
Figure 11B:
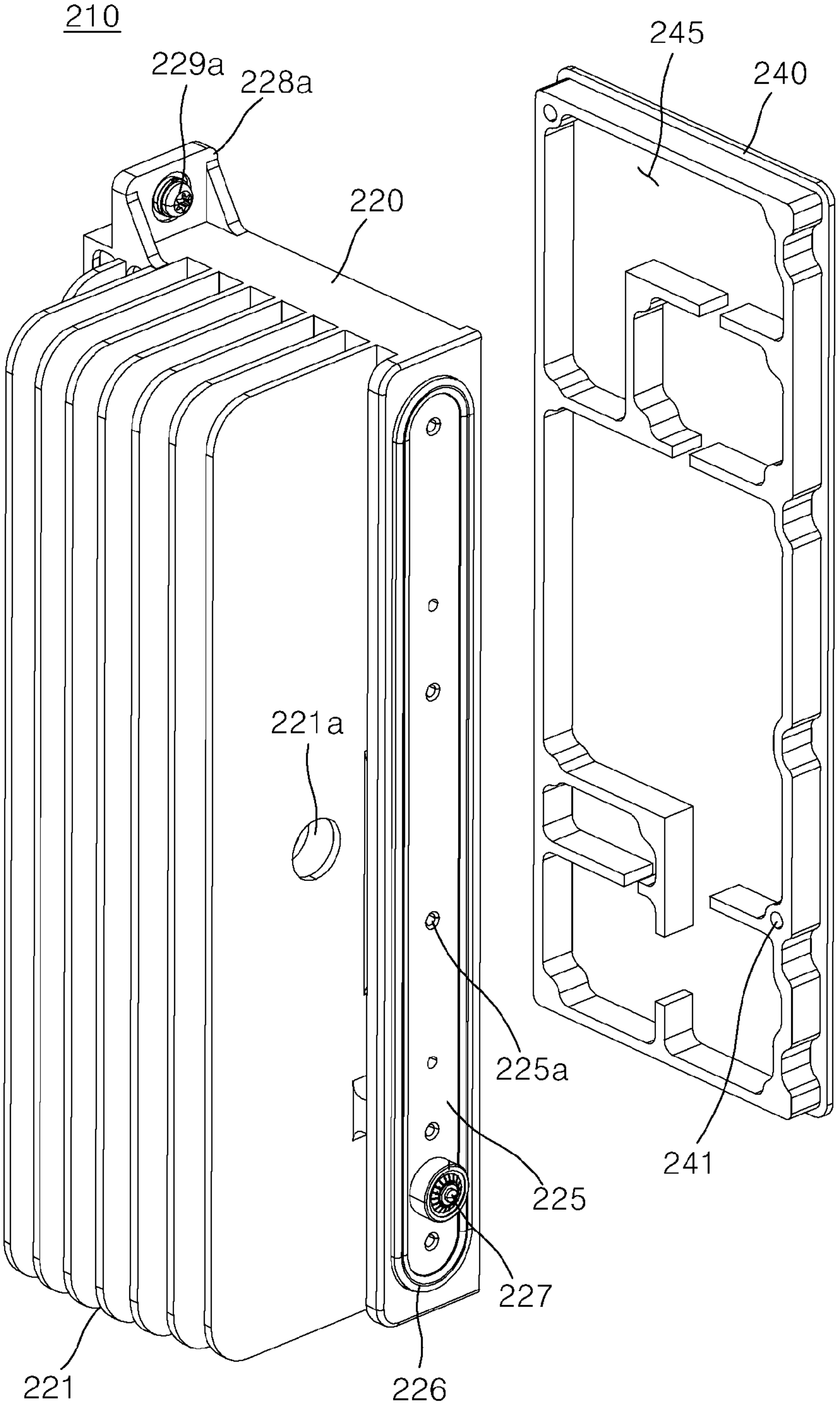
Figure 12A:
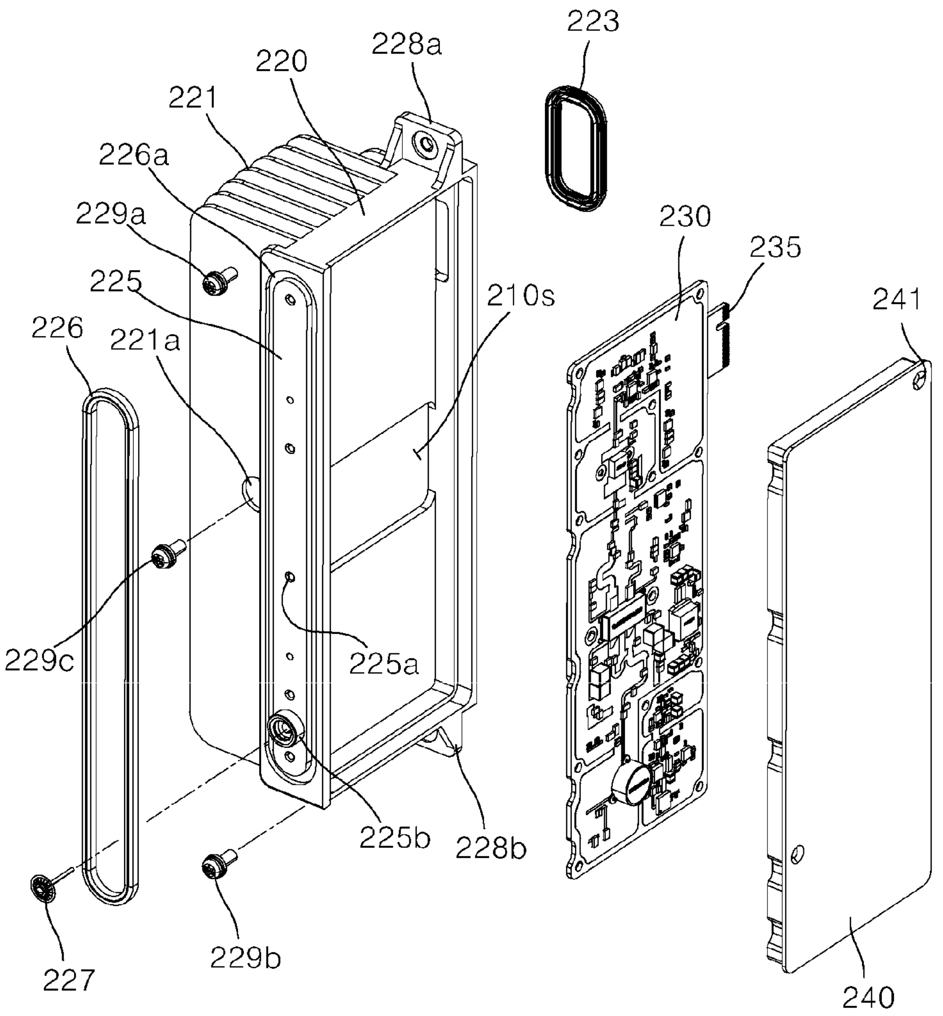
FIGS. 12A and 12B are exploded perspective views in which the amplification unit module in FIGS. 11A and 11B is exploded in one side direction and the other side direction.
Figure 12B:
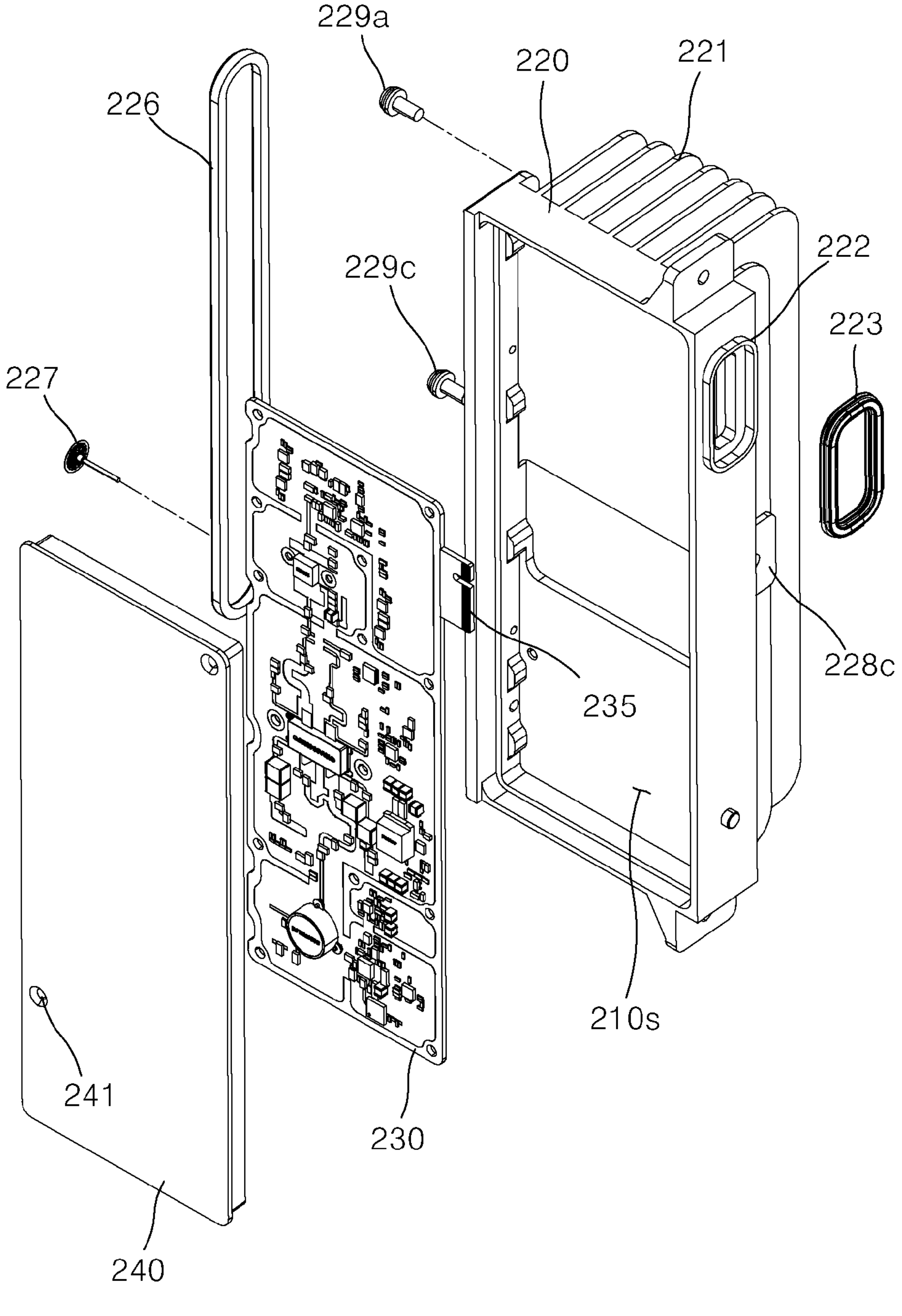

FIGS. 11A and 11B are exploded perspective views illustrating an amplification unit substrate of the amplification unit module positioned on an intermediate outside air layer among the components of FIG. 2, and FIGS. 12A and 12B are exploded perspective views in which the amplification unit module in FIGS. 11A and 11B is exploded in one side direction and the other side direction.

The amplification unit module 200 functions to receive each of a signal from the main board 130 and a signal from the RF module 300 to amplify the signals by a predetermined value and output the amplified signals.

Here, the amplification unit module 200 may include an amplification unit body 220 having a substrate seating space 210S having one side or the other side that is open in a width direction, an amplification unit substrate 230 seated inside the amplification unit body 220 and having a front end of an edge electrically connected to the RF module 300 and a rear end of the edge electrically connected to the main board 130, and an amplification unit cover 240 provided to cover the amplification unit substrate 230.

As illustrated in FIGS. 11A to 12B, the amplification unit module 200 may be simply electrically connected to the RF module 300 to be described below in a feed through-pin connection manner, and the amplification unit module 200 and the RF module 300 may be physically coupled through module assembly screws 319 (see FIG. 13A) fastened to the amplification unit body 220 through screw assembly holes 225*a* of an assembly end portion 225 formed on a front end of the amplification unit body 220.

A front ring interposition groove 226*a* having the front side foreign substance inflow prevention ring 226 interposed therein may be formed around the assembly end portion 225, and the front side foreign substance inflow prevention ring 226 interposed in the front ring interposition groove 226*a* may be elastically compressed by a coupling force, which is provided by an operation in which the module assembly screws 319 fastened by passing through a front antenna housing 310 from the front of the front antenna housing 310 among the components of the RF module 300 is fastened to the screw assembly grooves 225*a*, to perform a sealing function.

A socket through-hole boss 222 through which a male socket portion 235 of the amplification unit substrate 230 passes may be provided on a rear end of the amplification unit body 220 in the form of an annular rib, and the rear side foreign substance inflow prevention ring 223 may be interposed in an end of a protruding annular rib of the socket through-hole boss 222. The rear side foreign substance inflow prevention ring 223 may be elastically compressed between the rear end of the amplification unit body 220 and the socket through-hole portion 125 formed on the front surface of the front housing 120 to perform a sealing function.

Here, screw fastening ends **228*a* to 228*c* in which each screw through-hole (not illustrated) is provided for screw-assembling the front housing 120 are formed at three positions of the rear end of the amplification unit body 220, and each of assembly screws 229*a* to 229*c* is fastened by passing through one of the screw through-holes from a front to a rear to provide a coupling force at which the rear side foreign substance inflow prevention ring 223** may be elastically compressed.

At least one **228*c* of the three screw fastening ends 228*a* to 228*c* may be formed at a position in which the assembly screw 229*c* is fastened by passing through a plurality of amplification unit heat sink fins 221 integrally formed on an outer surface of the amplification unit body 220, and for smooth fastening of the assembly screw 229*c* corresponding to the screw fastening end 228*c*, a tool insertion groove 221*a* having a size in which a fastening tool may be at least inserted, such as a driver tool, may be formed to pass through the plurality of amplification unit heat sink fins 221**.

The amplification unit substrate 230 may be coupled to the RF module 300 in the feed through-pin connection manner via the through-pin terminal 227 and coupled to the main board 130 in the socket pin connection manner.

To this end, at least one male socket portion 235 to be coupled to the main board 130 in the socket pin connection manner may be provided on the amplification unit substrate 230.

The amplification unit substrate 230 may be closely coupled to an inner surface of the amplification unit body 220, and the plurality of amplification unit heat sink fins 221 for dissipating the heat generated from the analog amplification elements of the amplification unit substrate 230 to the outer space may be integrally formed on the outer surface of the amplification unit body 220. At least one of a power amplifier (PA) element and a low noise amplifier (LNA) element as the analog amplification element may be mounted on the amplification unit substrate 230.

The analog amplification unit elements (PA elements and LNA elements), which are the main heating elements, are components conventionally mounted on the main board 130 in the inner space 110S between the rear housing 110 and the front housing 120, but in one embodiment of the present disclosure, the analog amplification unit elements are manufactured in units of module such as the amplification unit module 200 and changed in design to be exposed to the intermediate outside air layer MS side defined by the front surface space of the front housing 120, which is a space from which heat is easily dissipated, it is possible to distribute a thermal overload on the inner space 110S and improving heat-dissipation performance.

Here, as illustrated in FIGS. 11A and 12A, the amplification unit substrate 230 may be seated and installed to have one surface in close contact with an inner surface of the substrate seating space 210S of the amplification unit body 220, and one PA, which is a power amplifier among the analog amplification elements, may be mounted on the other surface to form a 1T1R. In the case of the antenna apparatus 1A according to one embodiment of the present disclosure, a total of eight amplification unit modules 200 may be installed, thereby implementing an 8T8R.

The heat generated from the PA may be easily dissipated the outside through the plurality of amplification unit heat sink fins 221 integrally formed adjacent to the inner surface of the substrate seating space 210S.

The substrate seating space 210S of the amplification unit body 220 may be shielded by an operation in which the amplification unit cover 240 is fastened to the amplification unit body 220 through the assembly screws (not illustrated) passing through cover assembly holes 241 after the amplification unit substrate 230 is installed. Here, since the amplification unit body 220 and the amplification unit cover 240 are also exposed to the intermediate outside air layer MS, it is preferable that the amplification unit body 220 and the amplification unit cover 240 are provided in a sealed structure in which the inflow of foreign substances such as rainwater can be completely blocked.

The amplification unit module 200 configured as described above may be coupled to the main board 130 by the male socket portions 235 provided on the rear end of the amplification unit substrate 230 in the socket pin connection manner and coupled to the RF filter unit 330 by the through-pin terminals 227 provided on the front end of the amplification unit substrate 230 in the feed through-pin connection manner.

Figure 13A:
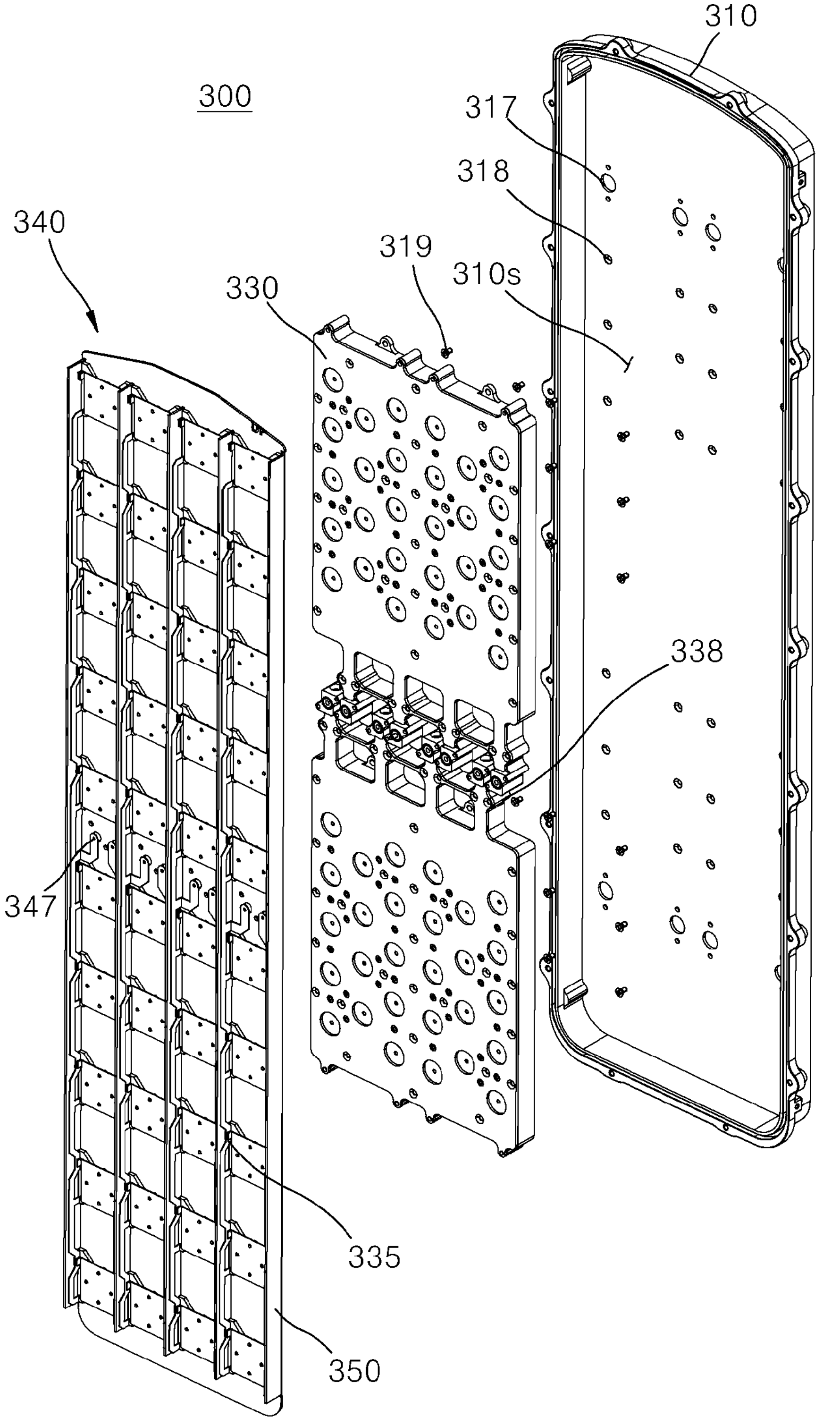
FIGS. 13A and 13B are an exploded perspective view illustrating a front portion of a radio frequency (RF) module excluding a radome panel among the components of FIGS. 2A and 2B and an exploded perspective view of a rear portion thereof.
Figure 13B:
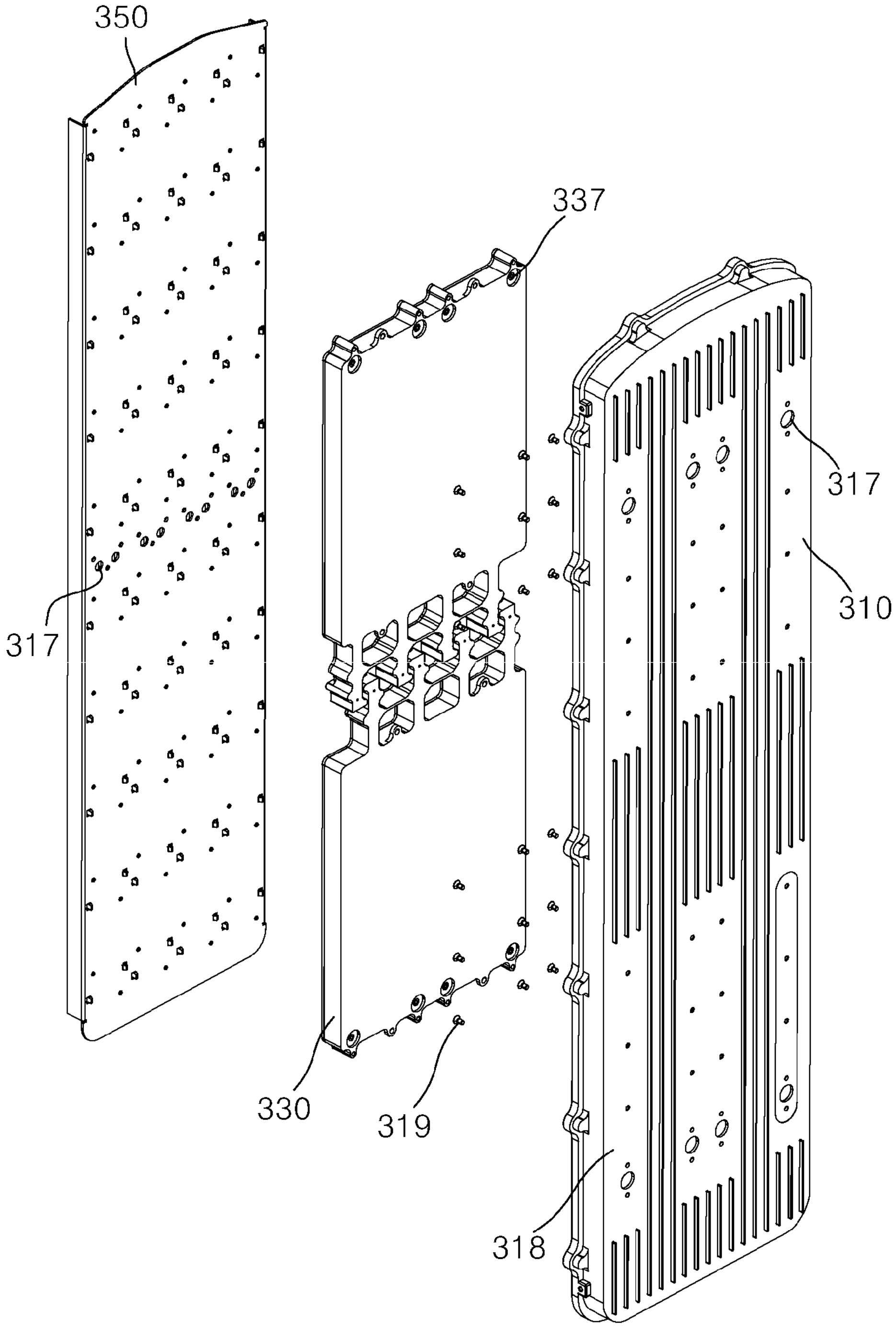
Figure 14A:
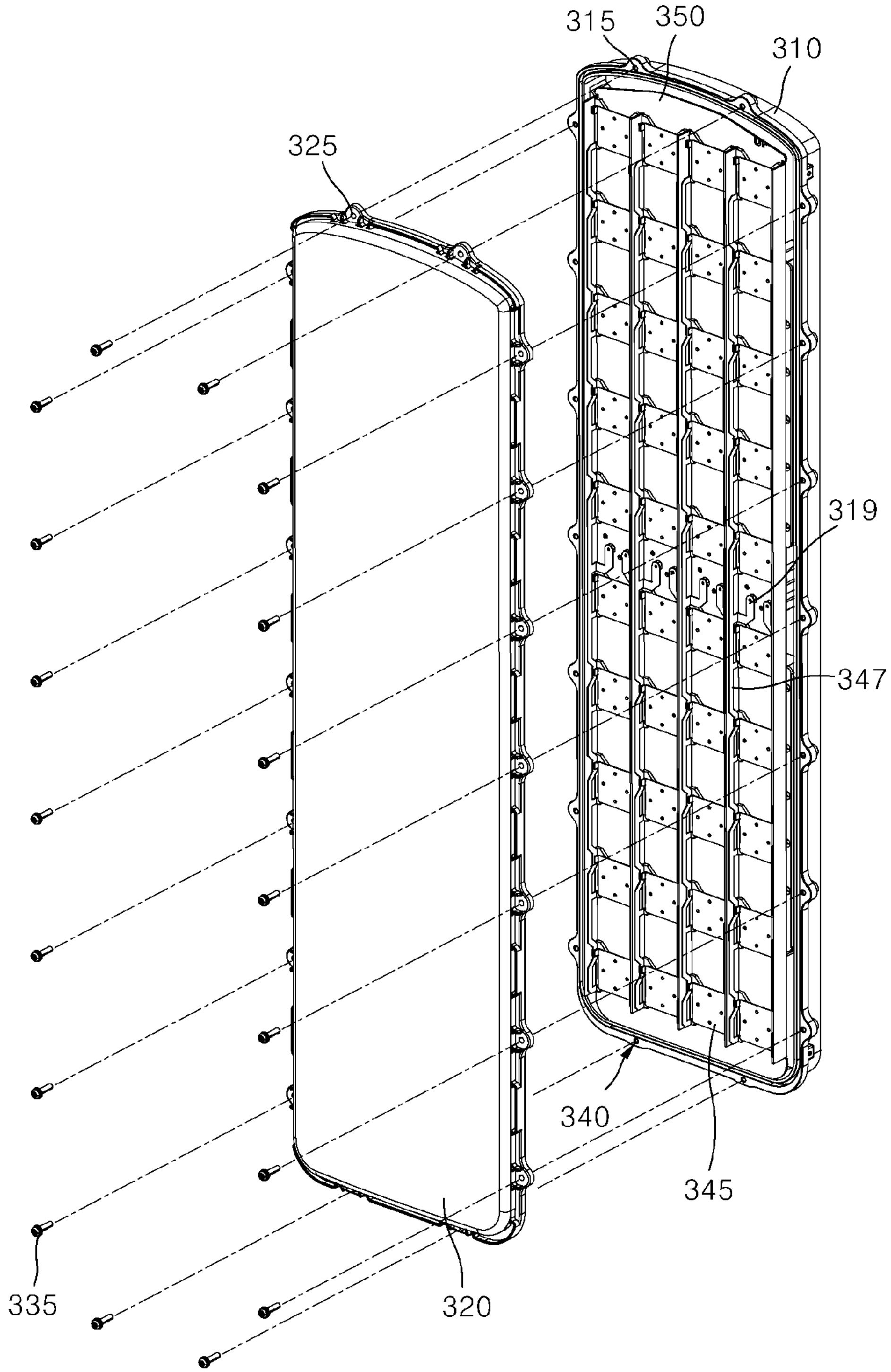
FIGS. 14A and 14B are an exploded perspective view of a front portion of the RF module and an exploded perspective view of a rear portion thereof illustrating a coupling relationship of the radome panel among components of the RF module.
Figure 14B:
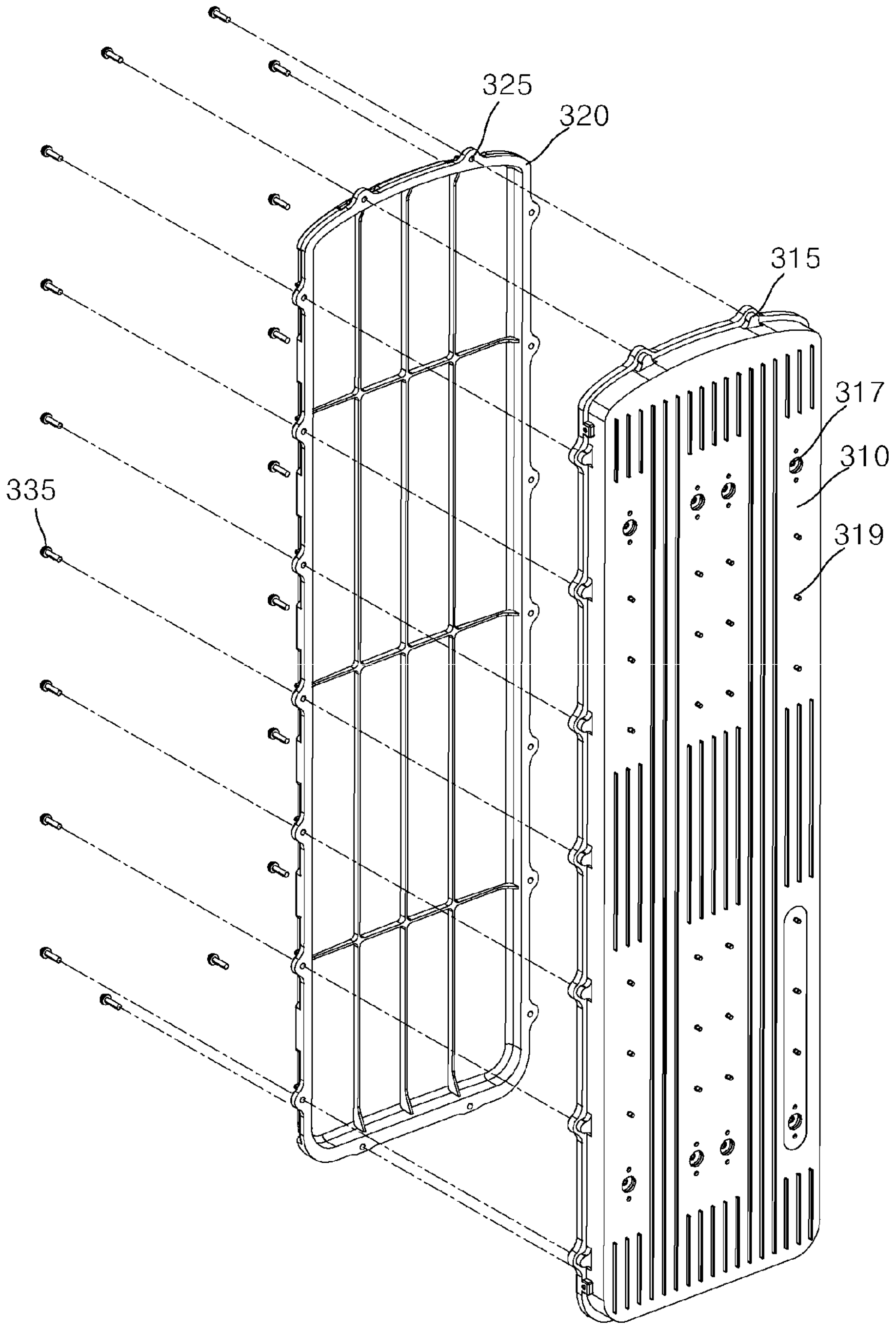
Figure 15A:
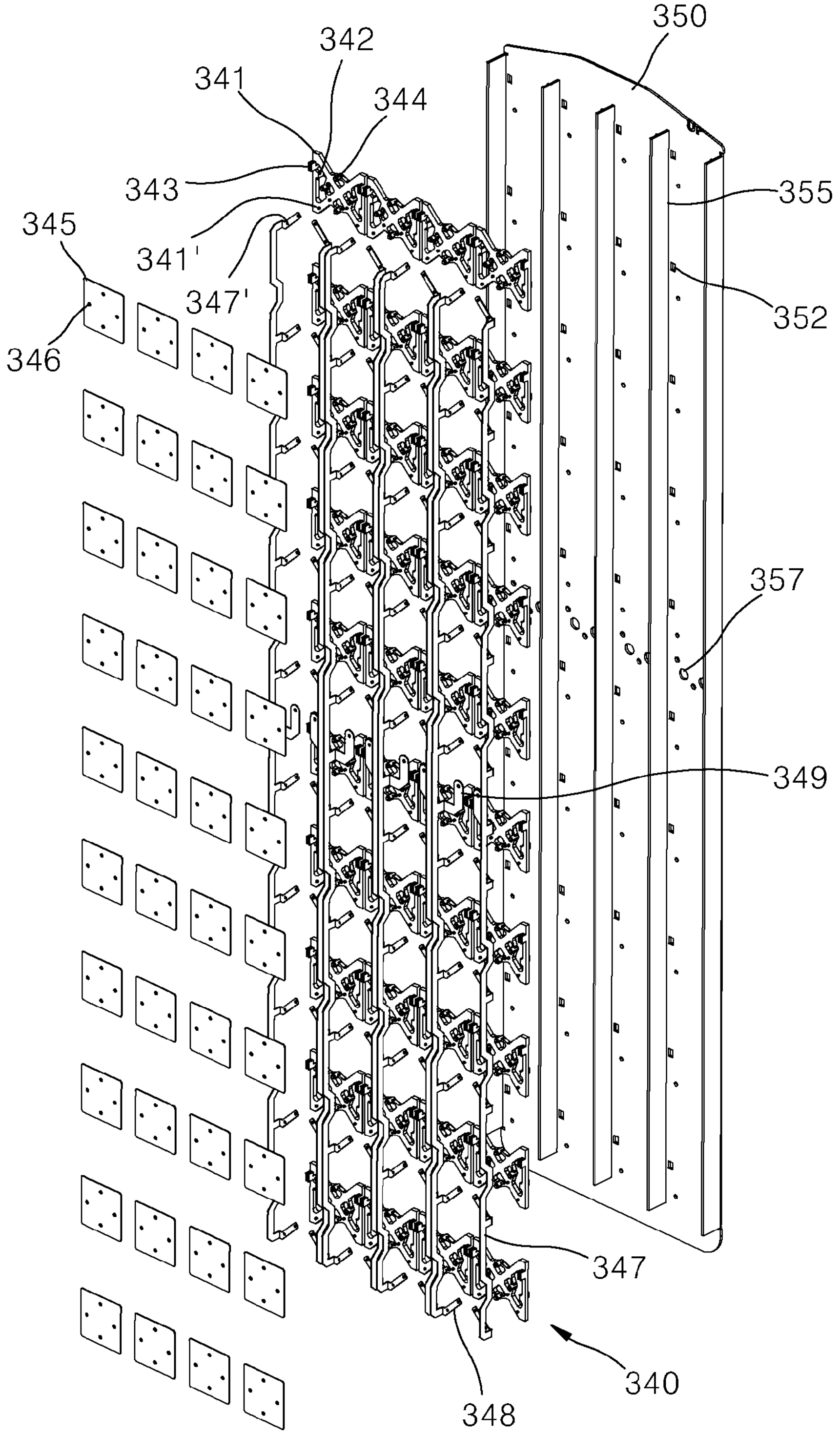
FIGS. 15A and 15B are an exploded perspective view of the front portion of the RF module and an exploded perspective view of the rear portion thereof illustrating an antenna element unit among the components of the RF module.
Figure 15B:
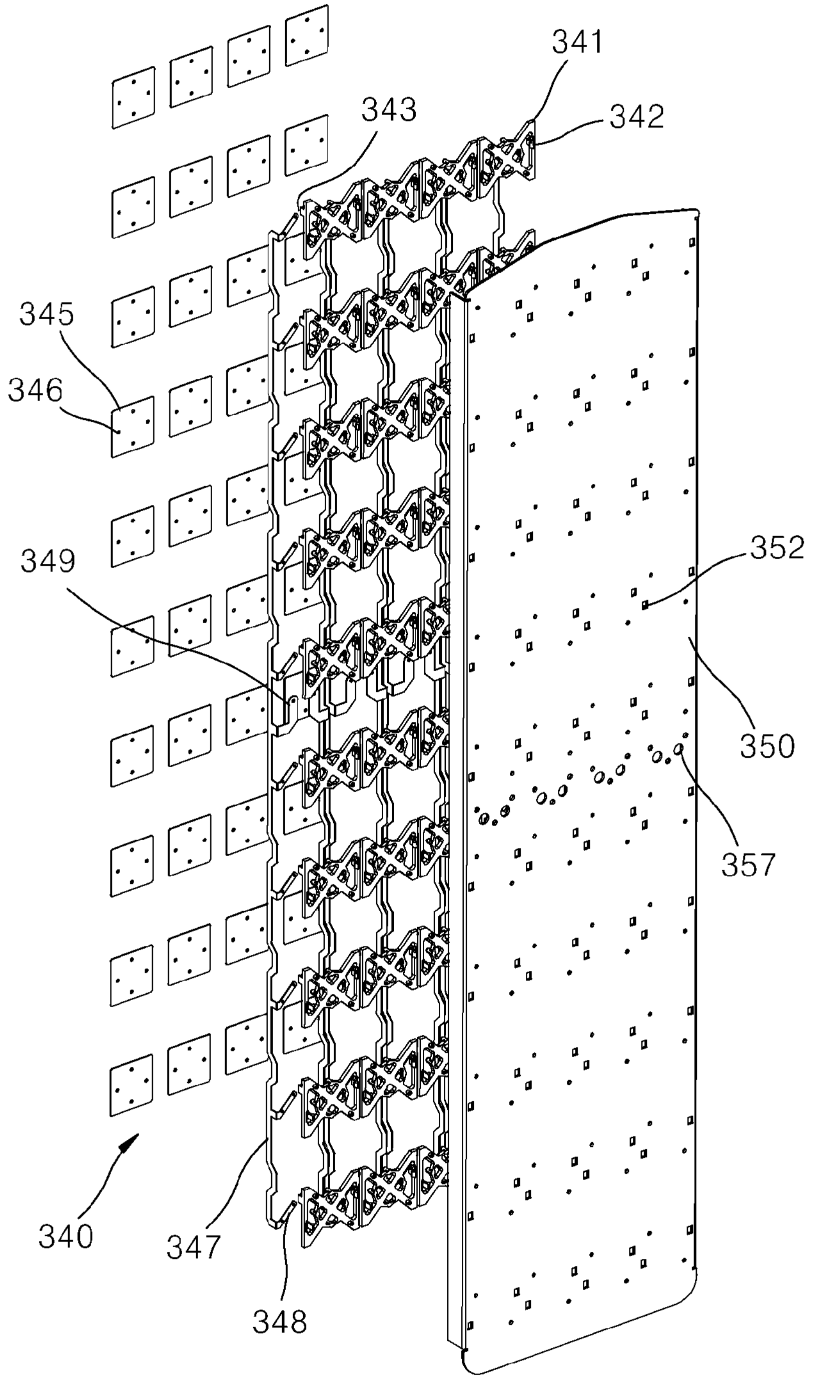
Figure 16A:
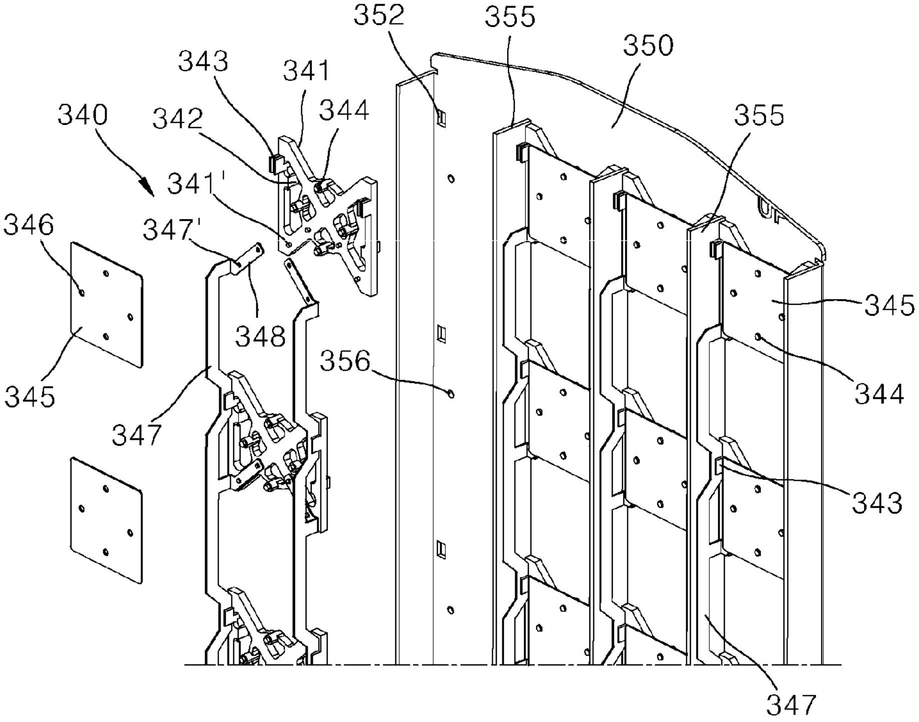
FIGS. 16A and 16B are an exploded perspective view of the front portion of the RF module and an exploded perspective view of the rear portion thereof illustrating a state in which radiating elements and feed lines are connected to a reflector panel.
Figure 16B:
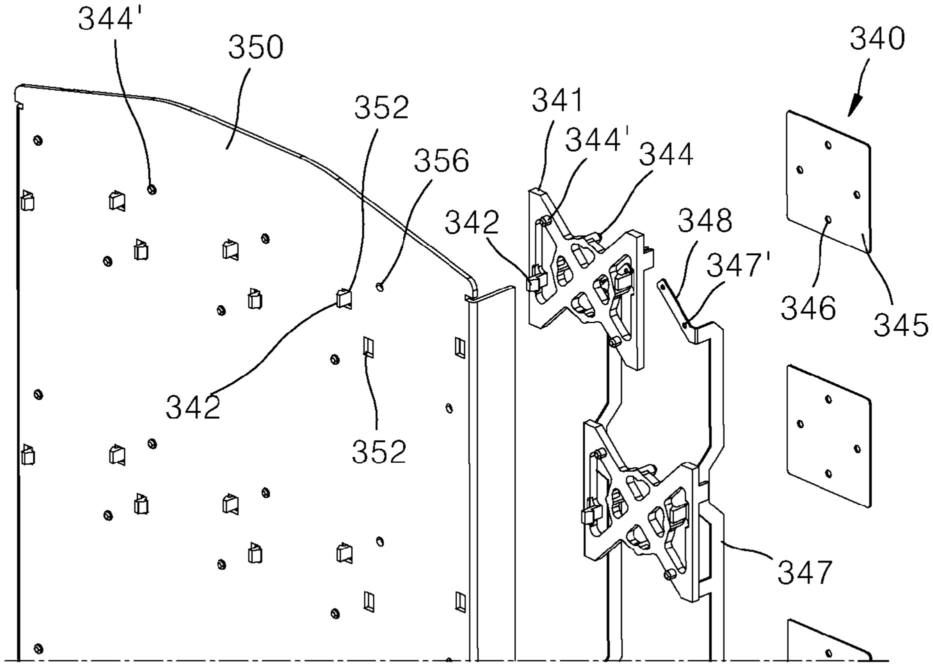
Figure 17A:
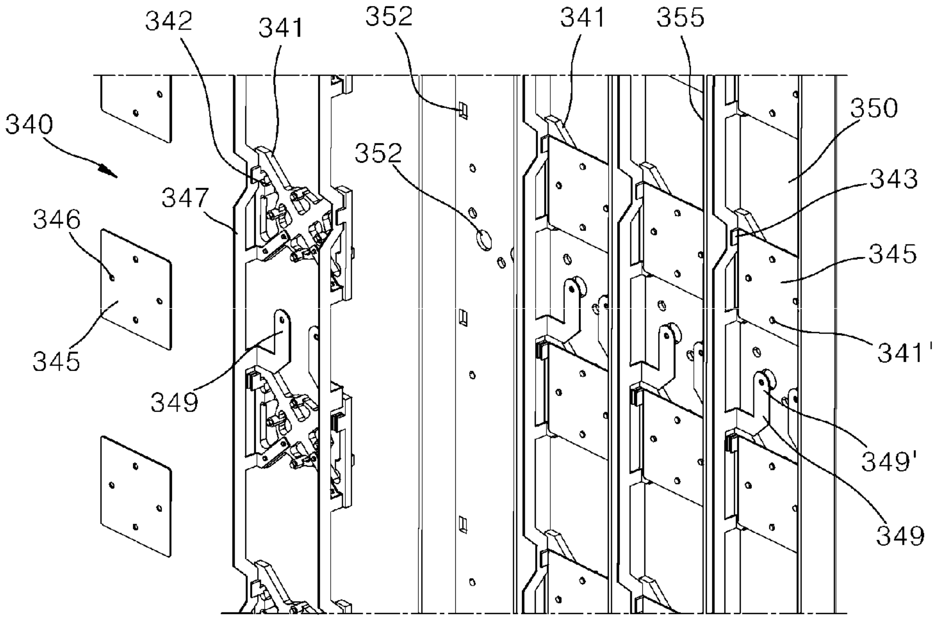
FIGS. 17A and 17B are an exploded perspective view of the front portion of the RF module and an exploded perspective view of the rear portion thereof illustrating a state in which the antenna element unit is electrically connected to the RF filter unit by passing through the reflector panel.
Figure 17B:
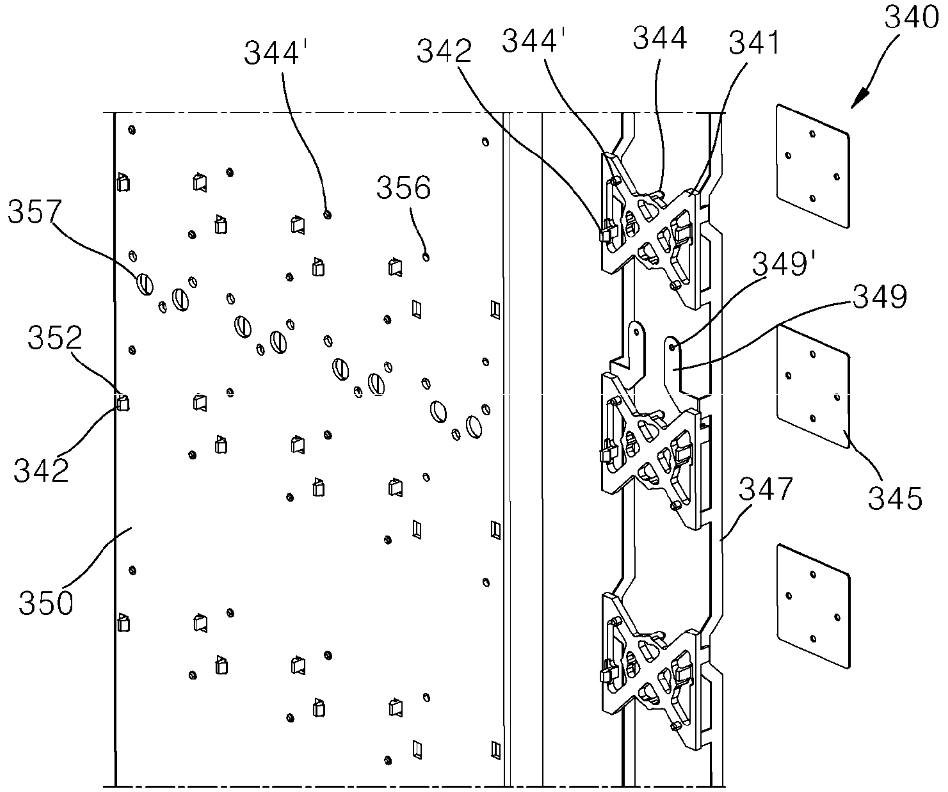
Figure 18:
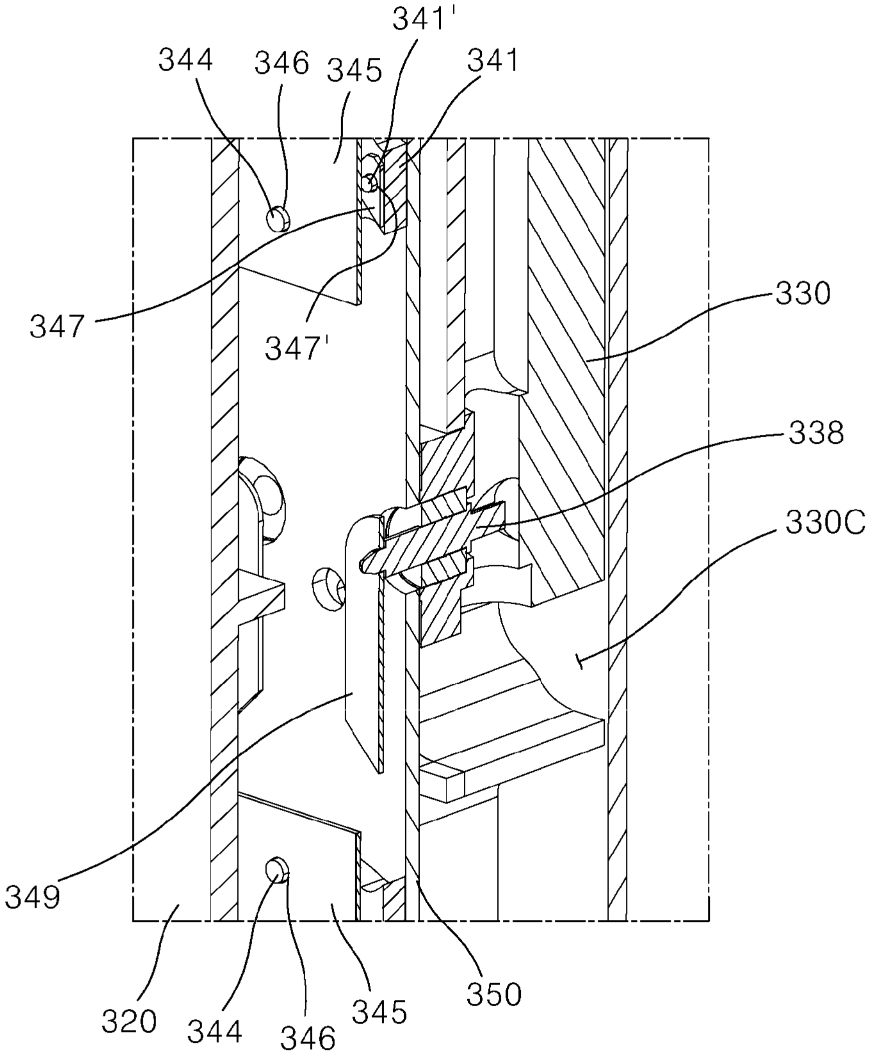
FIG. 18 is a perspective view for describing a state in which the antenna element unit in FIGS. 17A and 17B is electrically connected to the RF filter unit.

FIGS. 13A and 13B are an exploded perspective view illustrating a front portion of a radio frequency (RF) module excluding a radome panel among the components of FIGS. 2A and 2B and an exploded perspective view of a rear portion thereof, FIGS. 14A and 14B are an exploded perspective view of a front portion of the RF module and an exploded perspective view of a rear portion thereof illustrating a coupling relationship of the radome panel among components of the RF module, FIGS. 15A and 15B are an exploded perspective view of the front portion of the RF module and an exploded perspective view of the rear portion thereof illustrating an antenna element unit among the components of the RF module, FIGS. 16A and 16B are an exploded perspective view of the front portion of the RF module and an exploded perspective view of the rear portion thereof illustrating a state in which radiating elements and feed lines are connected to a reflector panel, FIGS. 17A and 17B are an exploded perspective view of the front portion of the RF module and an exploded perspective view of the rear portion thereof illustrating a state in which the antenna element unit is electrically connected to the RF filter unit by passing through the reflector panel, and FIG. 18 is a perspective view for describing a state in which the antenna element unit in FIGS. 17A and 17B is electrically connected to the RF filter unit.

As illustrated in FIGS. 13A to 18, the RF module 300 may include a front antenna housing 310 stacked and coupled to the front of the amplification unit module 200 and having the RF filter unit 330 and the antenna element unit 340 embedded therein, and a radome panel 320 coupled to a front end of the front antenna housing 310 to protect the RF filter unit 330 and the antenna element unit 340 from the outside.

Here, the radome panel 320 may be waterproofly coupled to the front antenna housing 310. That is, a gasket groove in which a waterproof gasket (not illustrated) is interposed may be provided in an edge end of the front antenna housing 310, and the waterproof gasket may be elastically deformed by a coupling force generated upon coupling of the radome panel 320 to the front antenna housing 310 to seal an inner installation space 310S of the front antenna housing 310.

Referring to FIGS. 14A and 14B, a plurality of screw fastening ends 315 each having a screw fastening hole formed along the edge end of the front antenna housing 310 may be provided to be spaced apart from each other, a plurality of screw through-hole ends 325 each having a screw through-hole formed along an edge end of the radome panel 320 may be provided to be spaced apart from each other, and the inner installation space 310S may be shielded by an operation in which an assembly screw 335 is fastened to each of the screw fastening end 315 and the screw through-hole end 325.

As illustrated in FIGS. 13A and 13B, the RF filter unit 330 may be formed of a cavity filter including at least one cavity 330C (see FIG. 18).

More specifically, a plurality of cavities 330C may be formed to be open forward on a filter body of the RF filter unit 330, and a resonant bar formed of a dielectric resonator (DR) or a metallic resonant rod may be provided inside each cavity 330C.

The RF filter unit 330 together with the antenna element unit 340 to be described below may be stacked and coupled to the inner installation space 310S of the front antenna housing 310 and coupled to provide electrical signal connection with the amplification unit substrate 230 of the amplification unit module 200 by passing through the front antenna housing 310.

To this end, at least one input port 337 to be coupled to the through-pin terminal 227 of the amplification unit module 200 in the feed through-pin connection manner may be provided on a rear portion of the RF filter unit 330. In addition, a through-pin connection hole 317 to which the through-pin terminal 227 is fastened by passing therethrough may be formed in the front antenna housing 310. For reference, a plurality of screw through-holes 318 may be formed in the front antenna housing 310 to be fastened to the amplification unit module 200 through the assembly screws 319 passing through the screw through-holes 318.

In addition, at least one connecting terminal portion 338 for electrical signal connection via the antenna element unit 340, which is stacked and coupled to the front of the RF filter unit 330, and a plurality of feed lines 347 to be described below may be provided on the front portion of the RF filter unit 330.

Meanwhile, a frequency filtering may be performed through structural features within the cavity 330C of the resonant bar including the DR or the metallic resonating rod, and a filtering tuning cover provided to cover all of the plurality of cavities and adjust a specific frequency filtering for each cavity may be coupled to a front surface of the filter body.

As illustrated in FIGS. 15A to 17B, the antenna element unit 340 may include the plurality of radiating elements (not illustrated) disposed to extend vertically, and the plurality of feed lines 347 having the air-strip structure as feed lines formed to supply a power to the plurality of radiating elements.

The plurality of radiating elements may be formed of any one of a plurality of dipole-type radiating elements and patch-type radiating elements 345. In one embodiment of the present disclosure, a case in which the plurality of radiating elements are the patch-type radiating elements 345 will be described.

As illustrated in FIGS. 15A and 15B, the RF module 300 may be disposed inside the front antenna housing 310 and may further include a reflector panel 350 for layer-partitioning the RF filter unit 330 and the antenna element unit 340.

Here, the plurality of feed lines 347 may be electrically connected to the RF filter unit 330 by passing through the reflector panel 350. To this end, a plurality of connecting holes 357 may be provided to be horizontally spaced by a predetermined distance from each other on a middle portion of the reflector panel 350, and the connecting terminal portions 338 formed on the RF filter unit 330 may be exposed forward through the connecting holes 357 and each connected to a pin connection hole 349' of a feeding terminal 349 formed on the middle portion of each of the plurality of feed lines 347.

Meanwhile, when the plurality of radiating elements are formed of the patch-type radiating elements 345, the antenna element unit 340 may include a plurality of patch base portions 341 assembled to be vertically spaced by a predetermined distance from each other on a front surface of the reflector panel 350, the plurality of patch-type radiating elements 345 seated on a front surface of each of the plurality of patch base portions 341, and the plurality of feed lines 347 electrically connected to each of the plurality of patch-type radiating elements 345.

Here, as illustrated in FIGS. 15A, 16A, and 17A, four radiating element protrusions 344 to which the plurality of patch-type radiating elements 345 are fitted and coupled, and feeding fixing protrusions 341' fitted and coupled to fixing holes 347' of the feeding connecting terminals 348 of the plurality of feed lines 347 may be formed on front portions of the plurality of patch base portions 341.

In addition, as illustrated in FIGS. 15A, 16A, and 17A, assembly guide slits 343 for installing each of the plurality of feed lines 347 may be formed in the front portions of the plurality of patch base portions 341, and the plurality of feed lines 347 may be inserted into and seated on the assembly guide slits 343, and thus a pre-assembly may be completed before the feeding fixing protrusions 341' of the feeding connecting terminals 348 are fitted and assembled.

In addition, as illustrated in FIGS. 15B, 16B, and 17B, hook protrusions 342 formed to extend rearward at two or more positions and hook-latched to hook latching holes 352 formed to pass through the reflector panel 350 in a front-rear direction may be formed on rear portions of the plurality of patch base portions 341.

Meanwhile, as illustrated in FIGS. 15A, 16A, and 17A, the plurality of patch base portions 341 and the plurality of patch-type radiating elements 345 may be vertically and horizontally arranged side by side, and interference prevention ribs 355 for reducing signal interference between the plurality of patch-type radiating elements 345 disposed adjacent to each other at least horizontally may be each provided to protrude forward from the reflector panel 350.

Here, it is preferable that front ends of the interference prevention ribs 355 are formed to have a larger protruding height than the front ends of the plurality of feed lines 347.

Meanwhile, referring to FIGS. 15B, 16B, and 17B, the feeding terminals 349 for feeding connection with the RF filter unit 330 may be provided on the middle portions of the plurality of feed lines 347, and mutual electrical connection may be made through the connecting holes 357 formed in the reflector panel 350.

As described above, in the antenna apparatus 1A according to one embodiment of the present disclosure, the antenna element unit 340 may have ten patch-type radiating elements 345 arranged to be vertically spaced apart from each other on the front surface of the reflector panel 350 and each horizontally arranged to reduce signal interference through one of the interference prevention ribs 355, and may be fixed to the reflector panel 350 to have four columns.

In addition, each of the patch-type radiating elements 345 may be provided to be feed-connected by using the feed line 347 having the air-strip structure vertically formed linearly.

In general, in the antenna apparatus, a reflector functions as a reflective surface in addition to providing a ground of an antenna circuit. For example, a rearward radiation of a dual-polarization antenna is reflected in a main radiation direction, thereby improving the beam efficiency of the dual-polarization antenna. In one embodiment of the present disclosure, the reflector panel 350 may perform a reflector function for improving the beam efficiency of the patch-type radiating elements 345 provided as a type of dual-polarization antenna.

In the antenna apparatus 1A according to one embodiment of the present disclosure configured as described above, as illustrated in FIG. 18, the antenna element unit 340 is stacked and disposed on the front of the RF filter unit 330, and as a structure for supplying a power to the antenna element unit 340, a simple and clear connection structure with the feeding terminals 349 of the plurality of feed lines 347 through the connecting terminal portion 338 is proposed.

As described above, the antenna apparatus 1A according to one embodiment of the present disclosure may form the intermediate outside air layer MS between the main body module 100 on which the main board 130 is provided and the RF module 300 on which the antenna element unit 340 and the RF filter unit 330 are provided and have the heavily heated amplification unit module 200 provided on the intermediate outside air layer MS so that the outside air heat-dissipation is directly made, thereby greatly improving heat-dissipation efficiency compared to the conventional one.

The antenna apparatus according to one embodiment of the present disclosure has been described above in detail with reference to the accompanying drawings. However, it goes without saying that the embodiments of the present disclosure are not necessarily limited by the above-described embodiments, and various modifications and implementation within the equivalent scope are possible by those skilled in the art to which the present disclosure pertains. Therefore, the true scope of the present disclosure will be determined by the appended claims.

INDUSTRIAL APPLICABILITY

The present disclosure provides an antenna apparatus, which may arrange an amplification unit module including an amplification unit substrate on which analog amplification elements are mounted on an intermediate outside air layer set between a main body module provided with the main board, which is positioned on a rear of the antenna apparatus, and an RF module positioned on a front thereof so as to be exposed to outside air, thereby dissipating system driving heat to be distributed in a front-rear direction and greatly improving heat-dissipation performance.

The invention claimed is:

1. An antenna apparatus comprising:

a main body module in which a main board is embedded;

a radio frequency (RF) module fixed to a front of the main body module so that an intermediate outside air layer is formed between the main body module and the RF module and having an RF filter unit and an antenna element unit embedded therein; and an amplification unit module disposed to be exposed to the intermediate outside air layer between the main body module and the RF module and including an amplification unit substrate on which analog amplification elements are mounted, wherein heat generated from heating elements mounted on the main board is dissipated through at least any one of the front and a rear of the main body module, heat generated from the amplification unit module is directly dissipated through the intermediate outside air layer; and a finger guard panel configured to partition the intermediate outside air layer between the main body module and the RF module from an outer space and formed with a plurality of airflow holes through which outside air of the outer space flows into the intermediate outside air layer or inside air of the intermediate outside air layer flows out to the outer space.

2. The antenna apparatus of claim 1, further comprising: a rear housing in which an inner space having an open front portion is formed so that a rear surface of the main board is closely seated; and a front housing coupled to a front end of the rear housing and coupled to shield the inner space, wherein a power supply unit (PSU) board having a front surface matched with a front surface of the main board and a surge substrate unit disposed to be spaced by a predetermined distance rearward from the rear surface of the main board are seated in the inner space separately from the main board.

3. The antenna apparatus of claim 2, wherein a plurality of front housing heat-dissipation fins for dissipating the heat generated from the heating elements mounted on front surfaces of the main board or the PSU board to the intermediate outside air layer are integrally formed on a front surface of the front housing.

4. The antenna apparatus of claim 1, wherein the amplification unit module is coupled to the main board by a male socket portion provided on a rear end of the amplification unit substrate in a socket pin connection manner and coupled to the RF filter unit by a through-pin terminal provided on a front end of the amplification unit substrate in a feed through-pin connection manner.

5. The antenna apparatus of claim 1, wherein the main body module and the RF module are provided to be spaced apart from each other in a front-rear direction with the amplification unit module interposed therebetween, and the finger guard panel has a front end coupled to the RF module and a rear end coupled to the main body module to partition the intermediate outside air layer between the main body module and the RF module from the outer space.

6. The antenna apparatus of claim 1, wherein the finger guard panel is provided to partition four surfaces forming the intermediate outside air layer from the outer space.

7. The antenna apparatus of claim 1, wherein the finger guard panel is formed to be rounded to the outside.

8. The antenna apparatus of claim 1, wherein the finger guard panel is formed so that an outer surface connecting a front end or a rear end and an outer surface connecting a left end or a right end have a rounded surface.

9. The antenna apparatus of claim 1, wherein the RF module includes:

a front antenna housing stacked and coupled to a front of the amplification unit module and having the RF filter unit and the antenna element unit embedded therein; and a radome panel coupled to a front end of the front antenna housing to protect the RF filter unit and the antenna element unit from the outside, and the radome panel is waterproofly coupled to the front antenna housing.

10. The antenna apparatus of claim 9, wherein the RF filter unit is formed of a cavity filter including at least one cavity.

* * * * *